(12) United States Patent
Lee et al.

(10) Patent No.: US 12,045,760 B2
(45) Date of Patent: Jul. 23, 2024

(54) COOKED FOOD DELIVERY DEVICE, AND FRANCHISE FOOD TRUCK INTEGRATED MANAGEMENT SYSTEM AND METHOD THEREOF

(71) Applicant: SHINSTARR PRESENTS CORP., Seoul (KR)

(72) Inventors: Sangrok Lee, Seoul (KR); Koangkyun La, Seoul (KR)

(73) Assignee: SHINSTARR PRESENTS CORP., Seoul (KR)

( * ) Notice: Subject to any disclaimer, the term of this patent is extended or adjusted under 35 U.S.C. 154(b) by 224 days.

(21) Appl. No.: 17/600,558

(22) PCT Filed: Jul. 21, 2021

(86) PCT No.: PCT/KR2021/009444
§ 371 (c)(1),
(2) Date: Sep. 30, 2021

(87) PCT Pub. No.: WO2022/019660
PCT Pub. Date: Jan. 27, 2022

(65) Prior Publication Data
US 2022/0318740 A1    Oct. 6, 2022

(30) Foreign Application Priority Data
Jul. 24, 2020   (KR) .................... 10-2020-0092258

(51) Int. Cl.
*G06Q 10/0832* (2023.01)
*G06Q 10/047* (2023.01)
(Continued)

(52) U.S. Cl.
CPC ....... *G06Q 10/0832* (2013.01); *G06Q 10/047* (2013.01); *G06Q 10/08355* (2013.01); *G06Q 50/12* (2013.01)

(58) Field of Classification Search
CPC ......... G06Q 10/0832; G06Q 10/08355; G06Q 10/08; G06Q 30/06; G06Q 50/12; G06Q 50/28; G06Q 10/047
(Continued)

(56) References Cited

U.S. PATENT DOCUMENTS 10,040,674 B2 *  8/2018  Xu ........................... B66F 9/065
2002/0169698 A1 * 11/2002  Chien .................. G06Q 10/087
                                                  700/214
(Continued)

FOREIGN PATENT DOCUMENTS

JP       2001-76296 A      3/2001
KR   10-2014-0126042 A    10/2014
(Continued)

OTHER PUBLICATIONS

Miles, "How Food Trucks Can Leverage Location Data to Optimize Sales" <http://web.archive.org/web/20180702160202/https://streetfightmag.com/2018/06/29/how-food-trucks-can-leverage-location-data-to-optimize-sales/> captured on Jul. 2, 2018 using Wayback Machine (Year: 2018).*
(Continued)

*Primary Examiner* — Jeff Zimmerman
*Assistant Examiner* — Brian A Tallman
(74) *Attorney, Agent, or Firm* — Stein IP, LLC

(57) ABSTRACT

A franchise food truck integrated management system and method thereof are disclosed. When food trucks are distributed in each region across a country, orders for food menu items are received in real time and the orders are assigned to suitable food trucks for delivery. The food truck integrated management method includes: receiving, by a server, a food ingredient order request from a first food truck; determining, by the server, a food ingredient supply route to the first food truck; and supplying order-requested food ingredients to the
(Continued)

first food truck according to the determined supply route. There is provided an effect that a number of food trucks that are distributed and operated in each region may receive food ingredients before the food ingredients run out, whereby ordered food menu items may be cooked in a timely manner and the food menu items may be provided at any time.

9 Claims, 20 Drawing Sheets

(51) Int. Cl.
  *G06Q 10/0835* (2023.01)
  *G06Q 50/12* (2012.01)
(58) Field of Classification Search
  USPC .......................................................... 705/332
  See application file for complete search history.

(56) References Cited

U.S. PATENT DOCUMENTS

| 2015/0019354 | A1* | 1/2015 | Chan ................. | G06Q 10/109 99/325 |
|---|---|---|---|---|
| 2015/0088779 | A1* | 3/2015 | Falcone ............. | G06Q 10/083 705/330 |
| 2018/0260778 | A1* | 9/2018 | Mazetti .............. | G01C 21/206 |
| 2019/0090679 | A1* | 3/2019 | Peng .................. | G05B 19/042 |
| 2020/0134747 | A1* | 4/2020 | Zhang ................ | G06Q 10/02 |
| 2020/0160307 | A1* | 5/2020 | Vick .................. | G06Q 20/325 |
| 2020/0167722 | A1* | 5/2020 | Goldberg ........... | G06Q 10/0832 |

FOREIGN PATENT DOCUMENTS

| KR | 10-2016-0109023 | A | 9/2016 |
|---|---|---|---|
| KR | 10-1896408 | B1 | 9/2018 |
| KR | 10-2019-0029249 | A | 3/2019 |
| KR | 10-2020-0039520 | A | 4/2020 |

OTHER PUBLICATIONS

"Food Truck" Wikipedia entry <https://en.wikipedia.org/wiki/Food_truck> (<http://web.archive.org/web/20171004160908/https://en.wikipedia.org/wiki/Food_truck> captured on Oct. 4, 2017 using Wayback Machine) (Year: 2017).*

Samsung, "The Safety Truck Could Revolutionize Road Safety", Jun. 18, 2015, <https://web.archive.org/web/20160110002549/https://news.samsung.com/global/the-safety-truck-could-revolutionize-road-safety> captured on Jan. 10, 2016 using Wayback Machine. (Year: 2016).*

International Search Report mailed Nov. 15, 2021, issued to the corresponding International Application No. PCT/KR2021/009444.

PCT Written Opinion of ISA mailed Nov. 15, 2021, issued to the corresponding International Application No. PCT/KR2021/009444.

* cited by examiner

FIG. 6
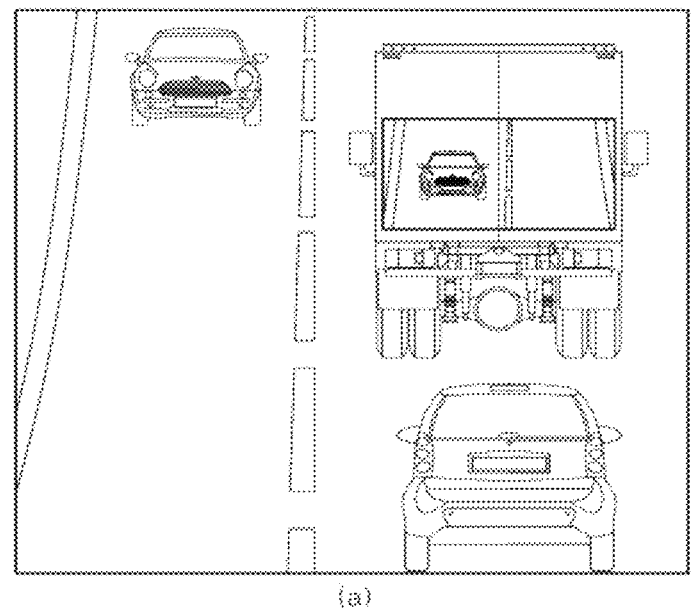
(a)
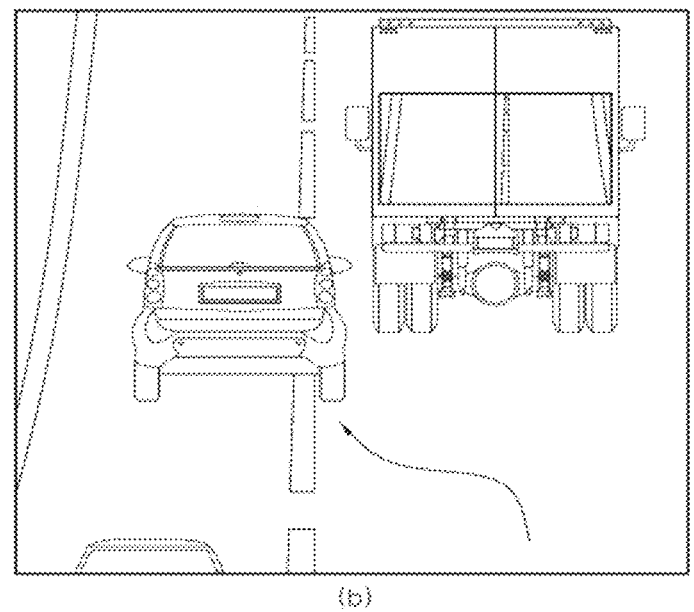
(b)

FIG. 8

Available delivery times and quantities

| Order time slot | fried menu item | spicy seasoned menu item | soy sauce seasoned menu item |
|---|---|---|---|
| 18:30 | two servings | one serving | one serving |
| 18:40 | four servings | four servings | four servings |
|  |  |  |  |
| 19:10 | one serving |  |  |
| 19:20 | two servings | one serving | one serving |

FIG. 9 orderer notification message order details order number : 777 order time : 2020. 4. 6. 15:50 PM ordered by: Gil-dong Hong address: room 303, 3-dong, 5 chicken-ro, jung-gu, Seoul menu: fried menu item (two servings)

price: 32,000 won expected delivery time : 2020. 4. 6. 18:30 PM

210

FIG. 22
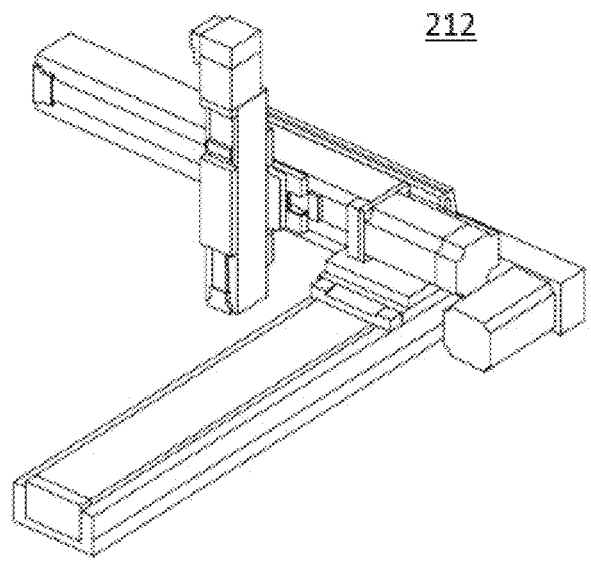
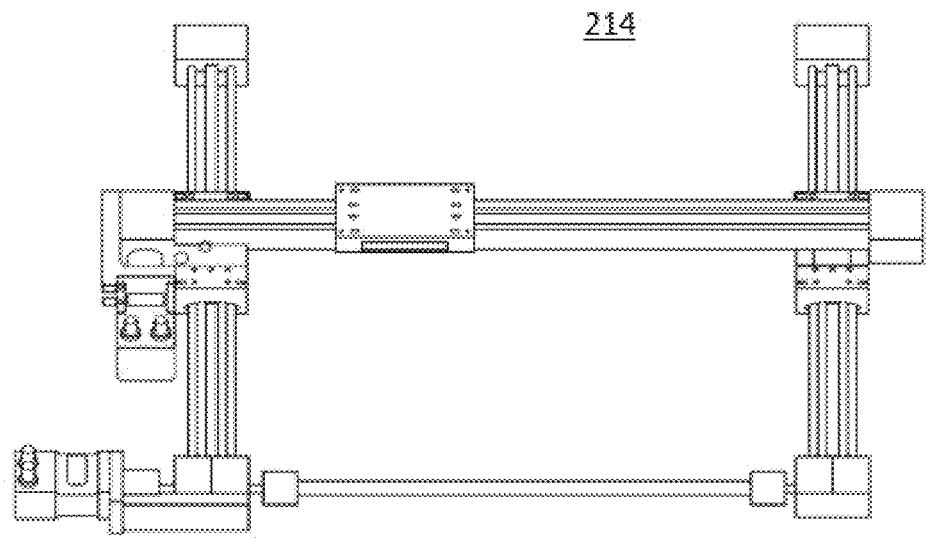

COOKED FOOD DELIVERY DEVICE, AND FRANCHISE FOOD TRUCK INTEGRATED MANAGEMENT SYSTEM AND METHOD THEREOF

CROSS-REFERENCE TO RELATED APPLICATIONS

This application is a national stage of International Application No. PCT/KR2021/009444, filed Jul. 21, 2021, which claims the benefit of Korean Application No. 10-2020-0092258, filed Jul. 24, 2020, in the Korean Intellectual Property Office, the disclosure of which is incorporated herein by reference.

TECHNICAL FIELD

The present invention relates to a cooked food delivery device, and a franchise food truck integrated management system and method thereof and, more particularly, relates to: a cooked food delivery device wherein, in a food truck, a time period from a point of time when a food menu item is ordered to a point of time when the food menu item is cooked is matched with a time period required for food delivery, so as to cook the food menu item while the food truck is moving and to complete the cooking at the time of delivery arrival, thereby enabling a consumer to immediately receive the cooked food; and a franchise food truck integrated management system and method thereof wherein, in a condition in which food trucks are distributed in each region across a country, when orders are placed for food menu items, the orders are respectively assigned to food trucks suitable for delivery and the food menu items are being cooked while the corresponding trucks drive to deliver, and by checking in real time how the corresponding food trucks cook and deliver the food menu items and checking current status of food ingredients and other consumables for each food truck, the food trucks that are in short supply of the food ingredients or other consumables or the food trucks that have requested the food ingredients or other consumables may be supplied with the food ingredients and other consumables.

BACKGROUND ART

Recently, food services using food trucks are rapidly growing. Such a method has already been established as a common culture in the United States and Europe, and in South Korea, a food service using food trucks is currently being provided in downtown areas and entertainment districts.

Usually, to use the food trucks, there are ways such that users go to nearby food trucks or search for the food trucks through search sites, or directly inquire owners of the food trucks for schedules and go to locations of the food trucks when the users already use the food trucks.

In order to solve inconvenience of finding and moving to food trucks, technology is required wherein, when the users order desired food, the orders are assigned to the food trucks suitable for delivery among the food trucks distributed in each region so that while the food is being cooked, the food is delivered to the users by the corresponding food trucks.

Meanwhile, food trucks provide customers with several predetermined food menu items, but when a large number of orders occur at once or the orders are concentrated on a specific menu through a specific event, food ingredients may run out in a short time. In this case, the demands of customers who come to visit the food trucks may not be met.

Therefore, there is a need for technology that checks status of food ingredients and other consumables of each food truck in real time in a situation where food trucks are distributed in each region across a country, and allows the food ingredients and other consumables to be supplied in advance before the food trucks run out of the food ingredients and other consumables so that supply of food menu items is smoothly conducted.

DISCLOSURE

Technical Problem

An objective of the present invention for solving the above-described requirement is to provide a cooked food delivery device and method thereof, wherein, in a food truck, a time period from a point of time when a food menu item is ordered to a point of time when the food menu item is cooked is matched with a time period required for food delivery, so as to cook the food while the food truck is moving and to complete the cooking at the time of delivery arrival, thereby enabling a consumer to immediately receive the cooked food.

Another objective of the present invention for meeting the above-described another requirement is to provide a franchise food truck integrated management system and method thereof wherein, in a condition in which food trucks are distributed in each region across a country, when orders are placed for food menu items, the orders are respectively assigned to food trucks suitable for delivery and the food menu items are cooked while the corresponding trucks drive to deliver the food, and by checking in real time how the corresponding food trucks cook and deliver the food menu items and checking the current status of food ingredients and other consumables for each food truck, the food trucks that are in short supply of the food ingredients or other consumables or the food trucks that have requested the food ingredients or other consumables may be supplied with the food ingredients and other consumables.

Technical Solution

According to an exemplary embodiment of the present invention for achieving the above objectives, a franchise food truck integrated management system includes: an order reception part configured to receive order requests for food menu items in real time and assign the order requests to food trucks suitable for delivery, or configured to receive the order requests for food ingredients and other consumables from each food truck; a food ingredient storage configured to store various food ingredients; a food ingredient loading part configured to load the food ingredients according to the order requests for the food ingredients from the food ingredient storage; a food ingredient supply part configured to supply the loaded food ingredients to requesting food trucks; and a food ingredient management part configured to inquire about a remaining amount of the food ingredients to each food truck, receive the remaining amount of the food ingredients from each food truck, determine supply routes of the food ingredients according to the order requests, and control operations so that the food ingredients according to the order requests are respectively supplied to the requesting food trucks according to the determined supply routes.

In addition, the franchise food truck integrated management system may further include: a food ingredient delivery vehicle configured to move to locations where the requesting food trucks are and provide the food ingredients to the requesting food truck according to the order requests for the food ingredients after loading the food ingredients from the food ingredient storage according to the order requests for the food ingredients.

In addition, the food ingredient management part may transmit, to specific food trucks closest to the requesting food trucks, messages requesting to go to the location of the requesting food trucks and provide urgent assistance with supplying the food ingredients and cooking the food menu items.

In addition, the food ingredient management part may respectively transmit, to the requesting food trucks and the specific food trucks, messages informing distribution ratios of profits generated by the urgent assistance with the supplying of the food ingredients and cooking of the food menu items.

Meanwhile, according to the exemplary embodiment of the present invention for achieving the above objectives, a food truck integrated management method includes: (a) receiving orders for food menu items from a server and generating order information; (b) assigning, by the server, food trucks on the basis of the order information; (c) transmitting, by the server, the order information to the assigned food trucks; (d) inquiring, by the server, of a remaining amount of food ingredients to each food truck including the assigned food trucks; (e) receiving, by the server, the remaining amount of the food ingredients from each food trucks; (f) inquiring, by the server, whether a food ingredient order is required to a first food truck whose remaining amount of the food ingredients, the remaining amount being received by the server, is less than or equal to a predetermined standard; (g) receiving, by the server, a food ingredient order request from the first food truck; (h) determining, by the server, a food ingredient supply route that finds a way to the first food truck; and (i) supplying order-requested food ingredients to the first food truck according to the determined supply route.

In addition, in step (b), in a state where location information of each food truck is received from each food truck and stored in a database, on the basis of delivery addresses according to the order information, the server may assign, as a delivery food truck, a nearest food truck or food trucks positioned at corresponding locations during delivery movement time among the food trucks distributed nearby.

In addition, in step (e), the server may receive the remaining amount of the food ingredients together with the location information from each food truck.

In addition, in step (e), the server may list the remaining amount of the food ingredients of each food truck in descending order.

in addition, in step (h), the server may transmit a message, requesting urgent assistance regarding supply of food ingredients and cooking of food menus by going to a place where the first food truck is located, to a specific food truck that is listed in the descending order so that the remaining amount of food ingredients is greater than or equal to the predetermined standard and is located closest to the first food truck.

In addition, in step (i), the server may respectively transmit, to the first food truck and the second food truck, messages informing distribution ratios of profits generated by the urgent assistance with the supplying of the food ingredients and cooking of the food menu items.

In addition, in step (h), when determining the food ingredient supply route to the first food truck, the server may determine whether to use a way including: supplying the food ingredients according to the food ingredient order request by loading from a food ingredient storage and then loading onto a food ingredient delivery vehicle; supplying the food ingredients by the first food truck coming to the food ingredient storage and taking the food ingredients according to the food ingredient order request; or supplying the food ingredients through the specific food truck.

Advantageous Effects

The present invention provides an effect that cooking start times are set according to ordered food menu items and delivery routes, so as to conduct cooking during delivery, whereby the ordered food menu items may be provided at the time desired by consumers and when the ordered food menu items are completed, the consumers may immediately receive the food menu items.

In addition, the present invention provides an effect that food trucks may be operated by enabling services from cooking to delivery without the need for labor force such as cooks so as to minimize labor costs, and the cooking is conducted according to predetermined recipes and the preset time, so that uniform, high-quality food menu items may be provided at all times.

In addition, the present invention has an advantage in that transport routes from locations of current food trucks to respective delivery locations are determined on the basis of customer's order information (e.g., expedited food delivery, delayed delivery) when receiving each food menu item order from customers, and cooking starts according to the required time of the determined transport routes, so that the cooking may be completed before arrival.

In addition, in the present invention, after orders are taken for food menu items and transport routes are selected, the corresponding food menu items are cooked while the food trucks are moving to respective delivery locations and the cooking is completed upon arrival at each delivery location, so that the food that is cooked upon the arrival at each delivery location may be served to the orderers.

In addition, the present invention has an advantage in that cooking start time is determined on the basis of the time required for predetermined transport routes, the cooking is conducted while the food truck is moving, and the cooked food is completed before arrival and served upon arrival, whereby consumers may be provided with cooking status of the ordered food menu items, expected arrival time, and the like while the food truck is moving.

In the present invention, food trucks that conduct cooking while moving after taking orders of food menu items and provide the cooked food menu items before arrival at respective delivery locations are distributed in each area, so that delivery may be made in real time by assigning the food menu items to appropriate food trucks to deliver the food, and also by identifying status of food ingredients in real time, the food trucks may be supplied with necessary food ingredients in a timely manner.

Therefore, according to the present invention, there is provided an effect that a plurality of food trucks that are distributed and operated in each area may receive food ingredients before the food ingredients run out, whereby ordered food menu items may be cooked in a timely manner and the food menu items may be provided at any time according to the needs of each consumer.

In addition, the present invention has an advantage in that, for food trucks with insufficient supply of food ingredients due to high demand, other food trucks with plenty of food ingredients and having no customers may approach the food trucks with insufficient supply of food ingredients, so that both supplying of the food ingredients and providing of the food menu items may be provided together.

DESCRIPTION OF DRAWINGS

FIG. 6 is a view showing an example of displaying front images through a rear display part in each food truck according to the exemplary embodiment of the present invention.

FIG. 8 is a view showing an example of receiving orders for food menu items according to available delivery times and quantities in an order reception part according to the exemplary embodiment of the present invention.

FIG. 9 is a view showing an example of transmitting order details by using a notification message from each food truck to an orderers' terminal according to the exemplary embodiment of the present invention.

FIG. 22 is a view showing an example of an ingredient loading part and an unloading part in each food truck according to the exemplary embodiment of the present invention.

DESCRIPTION OF THE REFERENCE NUMERALS IN THE DRAWINGS

Figure 1:
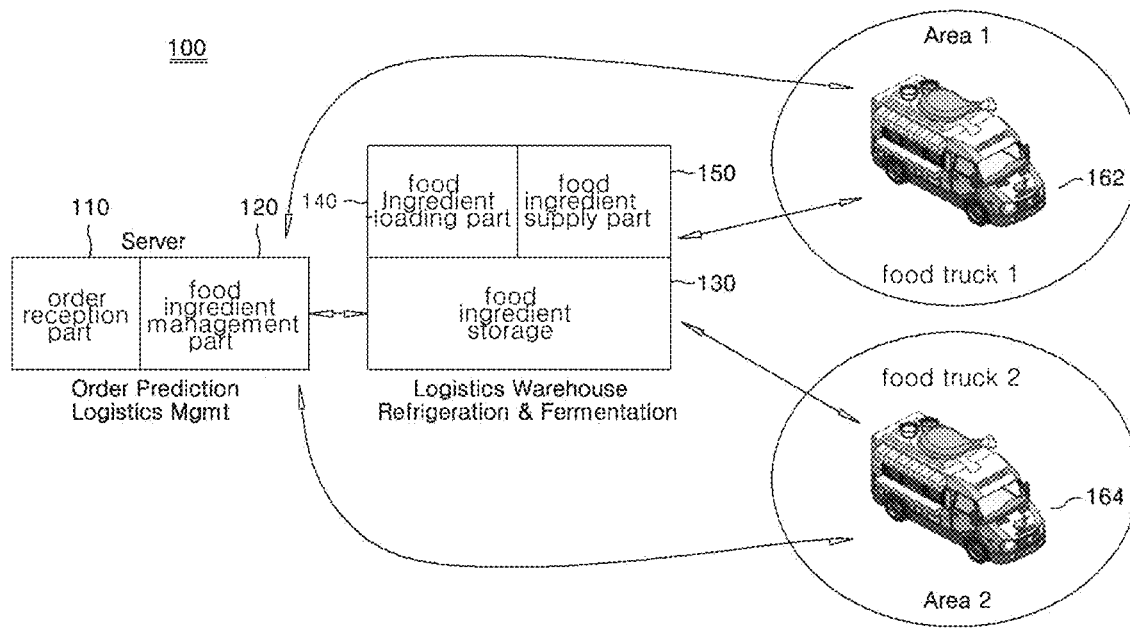
FIG. 1 is a configuration diagram schematically showing a configuration of a franchise food truck integrated management system according to an exemplary embodiment of the present invention.

1: cabin 2: box truck
10: smart terminal 20: dual interface NFC tag
21: RF interface antenna 22: memory
23: wired communication ports 30: electronic device
31: control unit (MCU) 35: wired signal receiver
36: interrupt generator 37: operation recognition part
100: franchise food truck integrated management system
110: order reception part f 120: food ingredient management part
130: food ingredient storage 140: food ingredient loading part
150: food ingredient supply part 162~164: food trucks
200: food truck 202: order reception part
204: front camera 206: path determination part
208: cooking determination part 210: ingredient storing part
212: ingredient loading part 214: unloading part
216: processing and cooking part 218: cooking camera
220: controller 222: menu finish part
224: rear display part

MODE FOR INVENTION

Unless otherwise defined, all terms (including technical and scientific terms) used in the present description may be used in a sense that can be commonly understood by those skilled in the art. In addition, terms defined in the commonly used dictionary are not ideally or excessively interpreted unless specifically defined.

Hereinafter, a franchise food truck integrated management system and method thereof according to a preferred exemplary embodiment of the present invention will be described in detail with reference to the accompanying drawings.

FIG. 1 is a configuration diagram schematically showing a configuration of a franchise food truck integrated management system according to the exemplary embodiment of the present invention.

Referring to FIG. 1, the franchise food truck integrated management system 100 according to the exemplary embodiment of the present invention may include: an order reception part 110, a food ingredient management part 120, a food ingredient storage 130, a food ingredient loading part 140, a food ingredient supply part 150, and a plurality of food trucks 162 to 164.

Here, only two of the plurality of food trucks 162 to 164 are shown in the drawing for convenience of description, but at least three or more food trucks may be arranged in each region. For example, in a country like Republic of Korea, at least one or more food trucks may be arranged in each district (i.e., Dong) in a city, and in each town or village (i.e., Myeon or Ri) in a province. In addition, since each food truck is an example of a cooked food delivery device, the present invention is not limited thereto, and the cooked food delivery device should be understood to include all means of transport, including robots, automobiles, and airplanes, which are capable of delivering cooked food. For convenience of description, in the present invention, food trucks, as a representative example of the cooking food delivery device, will be described as an example to describe the concept of the present invention.

The present invention is not limited thereto, and in a country with a large territory such as the United States or China, dozens of food trucks may be arranged and operated in each predetermined region.

In addition, the order reception part 110 and the food ingredient management part 120 may be implemented as, for example, a computer server or a separate server device, and may be respectively included as components in the form of hardware in the server device.

In addition, as one of programs executed on the computer server or the separate server device, the order reception part 110 and the food ingredient management part 120 may be implemented in the form of programs for executing food order reception or programs for managing food ingredients.

The order reception part 110 receives order requests for food menu items in real time and assigns the order requests to food trucks suitable for delivery, or receives order requests for food ingredients and other consumables from each food truck 162 to 164. That is, the order reception part 110 may receive the order requests in real time for the food menu items from orderers through an order application installed in each orderers' terminal, or receive food ingredient order requests according to the operation from the orderers through the order application installed in a user's (i.e., driver's) terminal in each food trucks 162 to 164. Here, the food trucks 162 to 164 may transmit the food ingredient order requests to the order reception part 110 of the server through the dual interface NFC tag installed therein.

Here, the order reception part 110 of the server receives the order requests for the food menu items in real time and forwards the order requests to respective food trucks closest to the orderers so that the food trucks may cook and supply the food menu items to the orderers.

The food ingredient management part 120 inquires about the remaining amount of the food ingredients to each food truck, receives the remaining amount of the food ingredients from each food truck, determines supply routes of the food ingredients according to the order requests, and controls operations so that the food ingredients according to the order requests are supplied to the requesting food trucks according to the determined supply routes.

The food ingredient storage 130 stores various food ingredients. That is, various food ingredients necessary for the food menu items cooked by each of the food trucks 162 to 164 are stored in the food ingredient storage 130.

The food ingredient loading part 140 loads the food ingredients according to each food ingredient order request from the food ingredient storage.

The food ingredient supply part 150 supplies the loaded food ingredients to each requesting food truck.

Figure 2:
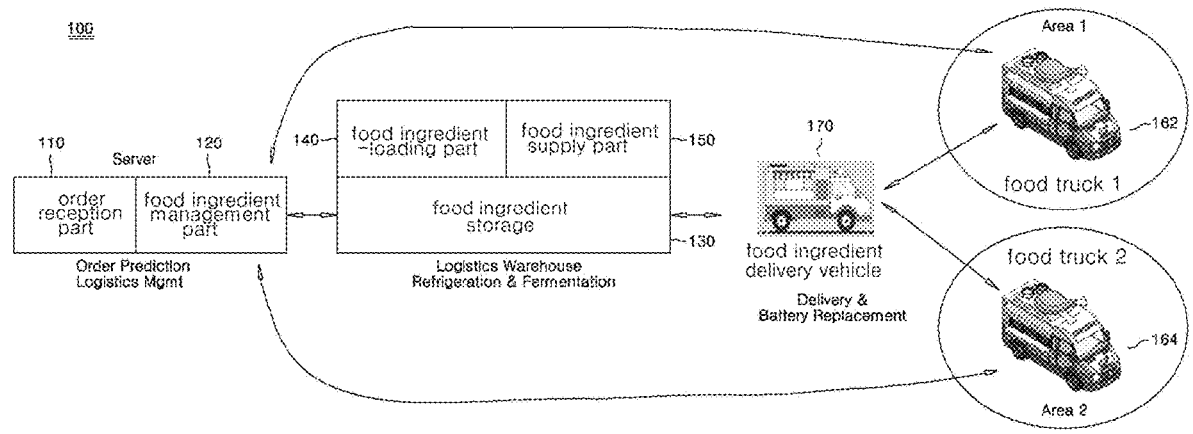
FIG. 2 is a view showing an example of supplying requested food ingredients to food trucks through a food ingredient delivery vehicle in the franchise food truck integrated management system according to the exemplary embodiment of the present invention.

Meanwhile, as shown in FIG. 2, the franchise food truck integrated management system 100 according to the exemplary embodiment of the present invention may further include a food ingredient delivery vehicle 170 that moves to locations where the requesting food trucks are and provides the food ingredients according to the food ingredient order requests to the requesting food trucks, respectively, after loading the food ingredients according to the food ingredient order requests from the food ingredient storage 130. FIG. 2 is a view showing an example of supplying requested food ingredients to food trucks through the food ingredient delivery vehicle in the franchise food truck integrated management system according to the exemplary embodiment of the present invention. In a case where the food trucks request to supply specific food ingredients through the food ingredient delivery vehicle because each of food trucks 162 to 164 has no time due to selling food menu items, the food ingredient delivery vehicle 170 loads the corresponding food ingredients according to the food ingredient order requests from the food ingredient storage 130, and then moves to each location of the requesting food trucks, thereby supplying the food ingredients to the requesting food trucks.

Meanwhile, the food ingredient management part 120 may transmit, to each specific food truck most closely positioned at each location of the requesting food trucks, a message requesting to go to each location of the requesting food trucks to provide urgent assistance with supplying the food ingredients and cooking food menu items.

In this case, the food ingredient management part 120 may respectively transmit, to requesting food trucks and specific food trucks, messages informing distribution ratios of profits generated by the urgent assistance with the supplying of the food ingredients and cooking of each food menu item.

Figure 3:
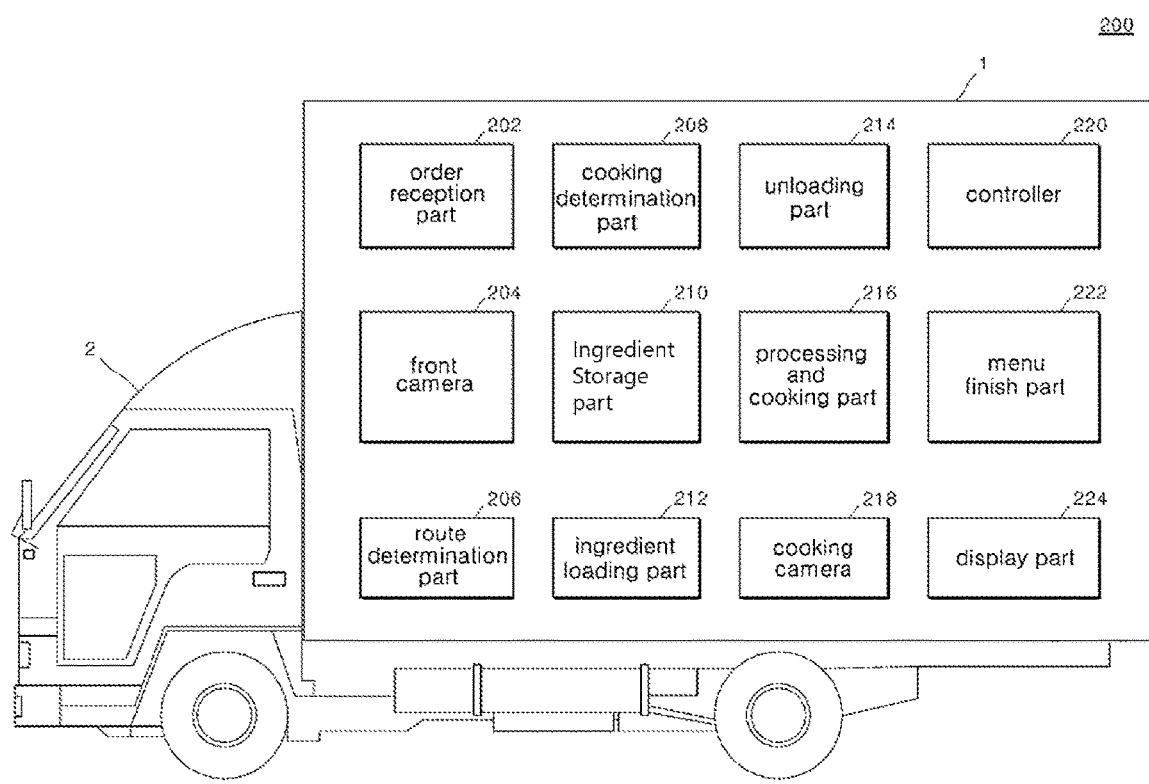
FIG. 3 is a configuration diagram showing an example of an internal configuration of each food truck according to the exemplary embodiment of the present invention.

FIG. 3 is a configuration diagram showing an example of an internal configuration of each food truck according to the exemplary embodiment of the present invention.

Referring to FIG. 3, each food truck 200 to which the present invention is applied may include a cabin 1 and a box truck 2 in which the cabin is installed.

Similar to a 1-ton trucks or a 2.5-ton truck, the box truck 2 functions as a vehicle transporting part in the front part thereof and serves as a loading part (for cargo and the like) in the rear part thereof. Depending on the use and purpose of each food truck 200, the box truck 2 having various sizes may be used. The vehicle transporting part transports a vehicle by energy power, and gasoline, diesel, LPG, electricity, and the like may be used as energy.

The cabin 1 forms a cooking space in which food may be cooked. In the present invention, the cooking space is created with support beams and panels and may be equipped with: a power supply means (i.e., an energy source for enabling a cooking means or a storage means to be operated); the cooking means (i.e., an induction, a cooking range, and the like for cooking food); and the storage means (i.e., a device, such as a refrigerator and a freezer, capable of storing food). In addition, by providing double installed windows for delivery in a passenger seat next to a driver's seat, a packaged food menu item may be delivered to a customer in a non-contact manner. That is, when a user (i.e., driver) opens an inner window of the double installed windows and places a finished food menu item, an orderer outside a food truck opens an outer window and takes the food menu item.

In the present invention, an example in which the cabin 1 is used as a cooking space of each food truck 200 will be mainly described, but the cabin 1 is not limited thereto, and may be variously applied to a cabin of a camper where people may board and lodge therein, an aftermarket cabin that is installed to be connectable to a box truck, and the like.

As shown in FIG. 3, each food truck 200 according to the exemplary embodiment of the present invention may include: an order reception part 202, a front camera 204, a route determination part 206, a cooking determination part 208, an ingredient storing part 210, an ingredient loading part 212, an unloading part 214, a processing and cooking part 216, a cooking camera 218, a controller 220, a menu finish part 222, and a display part 224.

Here, the order reception part 202, the front camera 204, the route determination part 206, the cooking determination part 208, the ingredient storing part 210, the ingredient loading part 212, the unloading part 214, the processing and cooking part 216, the cooking camera 218, the controller 220, the menu finish part 222, and the display part 224 may be connected to each other by wire or may be interconnected to each other through wireless communication.

The order reception part 202 may receive orders for food menu items and generate order information. The order reception part 202 may be arranged in the form of a terminal (i.e., dedicated terminal, computer, etc.) inside the cabin 1, and may be installed in the form of an application on a smartphone carried by the user (i.e., driver).

The front camera 204 may obtain front images by photographing front sights of roads on which food trucks move.

The route determination part 206 may determine delivery routes on the basis of the order information. Here, the order information on food menu items to be ordered may include types, quantities, prices, contact information, and delivery addresses.

Among delivery routes to a delivery address based on map data such as Google Maps or Naver Maps, the route determination part 206 may calculate a food cooking time according to the types and quantities of food menu items on the basis of the order information and determine an optimal delivery route corresponding to the calculated food cooking time.

In addition, on the basis of one piece of order information on one of orderer requests including: a request for an expedited delivery within a predetermined time; a request for a postponed delivery beyond a predetermined amount of time; and a request for separately delivering the food menu item to multiple delivery locations, the route determination part 206 may determine the optimal delivery route for the ordered food menu item by applying conditions about straight roads, curved roads, traffic lights, intersections, and speed bumps.

The cooking determination part 208 may determine a cooking start time of each food menu item on the basis of movement time along the delivery route. For example, when cooking a fried chicken menu, the cooking determination part 208 may determine to speed up or slow down the frying of chicken on the basis of delivery movement time. In addition, for example, according to the delivery time for a food menu item with four cooking steps, the cooking determination part 108 may determine the food menu item to be cooked in three cooking steps or in five cooking steps.

The ingredient storing part 210 stores food ingredients necessary for cooking food menu items. For example, the ingredient storing part 210 may be a refrigerator or the like that stores food ingredients at a predetermined temperature or less.

The ingredient loading part 212 may select, from the ingredient storing part, the food ingredients required for cooking of the ordered food menu item, and convey and load the food ingredients to the processing and cooking part. For example, the ingredient loading part 212 may be a conveying and loading device for removing and conveying the food ingredients from the refrigerator and loading the food ingredients to the processing and cooking part 216.

The unloading part 214 may be an unloading device configured to unload food that has been cooked from the processing and cooking part.

The processing and cooking part 216 may cook ordered food menu items while each food truck moves along delivery routes. For example, the processing and cooking part 216 may be a pressure fryer for frying chicken ingredients in vegetable oil. In addition, the processing and cooking part 216 is not limited thereto, and may be, for example, a pressure steamer that seals chicken ingredients and applies pressure and heat to steam the chicken ingredients.

The cooking camera 218 may obtain cooking images by photographing a process in which food is cooked in the processing and cooking part.

The controller 220 may generally control operations of the order reception part 202, the front camera 204, the route determination part 206, the cooking determination part 208, the ingredient storage 210, the ingredient loading part 212, the unloading part 214, the processing and cooking part 216, the cooking camera 218, the menu finish part 222, and the display part 224.

In addition, on the basis of the order information, the controller 220 may control to generate an orderable menu, available delivery time, and quantity according to status of other orders and a location of the current food truck, and according to the generated orderable menu and the available delivery time and quantity, and to take food menu item orders through the order reception part.

In addition, the controller 220 may control to provide states of cooking of the ordered food menu items and expected time to arrive to orderers' terminals as the food trucks move along the delivery routes, or may control to display information, which is useful to users or people around the food trucks, through a rear display part of each food truck, the information including: cooking process images, front sight images, food truck transport routes, and the like, captured by the rear camera and the front camera.

The menu finish part 222 may finish the food menu items by adding incidental ingredients such as toppings or seasonings to food that is unloaded after cooking, and by packaging the food.

The display part 224 is the rear display part installed at the rear of the food truck, and may display cooking process images and front sight images captured by the cooking camera and the front camera.

Figure 4:
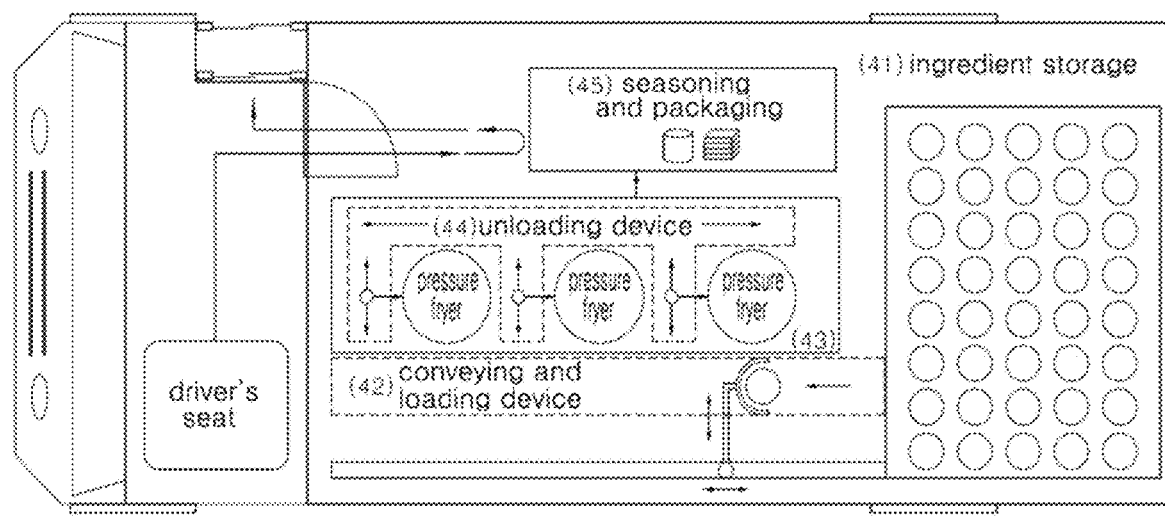
FIG. 4 is a view showing a cooking process in each food truck according to the exemplary embodiment of the present invention.

FIG. 4 is a view showing the cooking process in each food truck according to the exemplary embodiment of the present invention.

Referring to FIGS. 3 and 4, in each food truck 200 according to the present invention, a user in a driver's seat selects a food menu item and a cooking method according to order information and clicks on a cooking start button. Naturally, without receiving input from the user (i.e., driver) through the cooking start button, the controller 220 may control to automatically operate the ingredient loading part 212 and the processing and cooking part 216 according to the order information received through the order reception part 202 so that the food menu item is cooked according to the order right away.

In this case, the food ingredients required for the food menu item are stored in an ingredient storage 41 at positions each having horizontal and vertical coordinates.

In response to the input of the cooking start button, the controller 220 operates the ingredient loading part 212, and the ingredient loading part 212 conveys, for example, half of chicken ingredients from the ingredient storing part 210 and loads the chicken ingredients into a pressure fryer, which is the processing and cooking part 216.

Accordingly, the pressure fryer 43 as the processing and cooking part 216 conducts cooking by frying half the thicken, for example, at a temperature of 180° C. for 10 minutes according to a preset cooking method.

When cooking for about 10 minutes is finished in the pressure fryer, the controller 220 operates the unloading part 214, and the unloading part 214 unloads the half chicken from the pressure fryer and conveys half the chicken to the menu finish part 222.

Accordingly, the menu finish part 222 adds sauce to the well-fried half chicken for seasoning or adding other seasonings, and packages the well-fried half thicken, thereby providing the finished food menu item. Accordingly, the driver delivers the finished food menu item to the customer waiting outside the food truck through the double installed windows. That is, when the user (i.e., driver) opens the inner window of the double installed windows and places the finished food menu item, the orderer outside the food truck opens the outer window and takes the food menu item.

Figure 5:
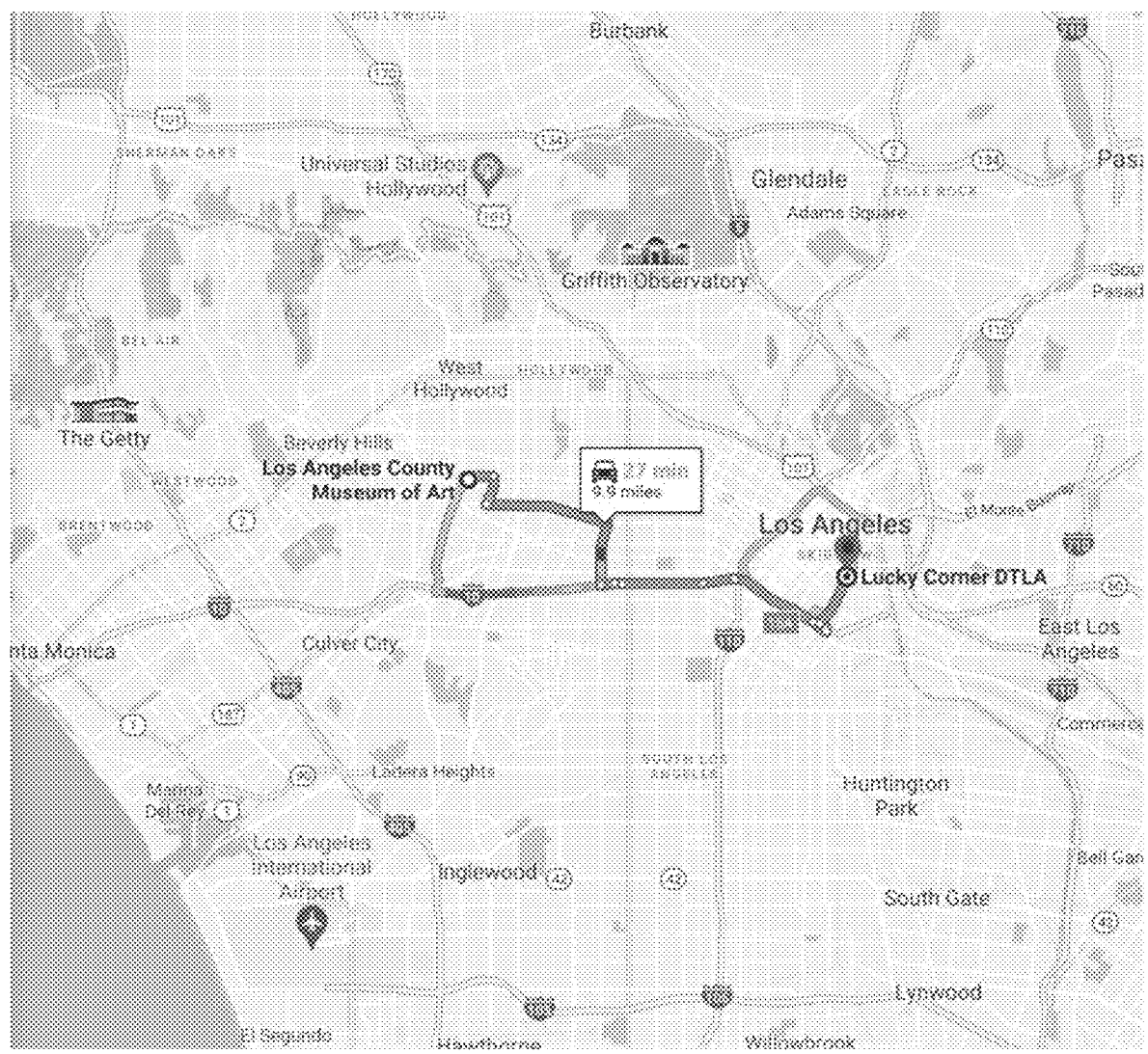
FIG. 5 is a view showing an example of setting a food menu item delivery route according to order information in each food truck according to the exemplary embodiment of the present invention.

FIG. 5 is a view showing an example of setting food menu item delivery routes according to order information in each food truck according to the exemplary embodiment of the present invention.

Referring to FIG. 5, on the basis of the order information, each food truck 200 according to the present invention may search for transport routes by means of the route determination part 206, from a location where each food truck is currently positioned to a delivery location, and for example, may set a delivery route that corresponds to the shortest distance.

In this case, the food truck 200 may include: a GPS receiver configured to receive a location signal and time information from an artificial satellite; a sensor configured to detect bearings, distances, speed, and the like of food trucks on the basis of the above-described information; an input part such as touch screens, keypads, or the like that generates signals according to user's manipulations; a display part configured to visually display states of operation by the input part, results of processing by the controller 220, transport routes of the food truck, and the like; an audio output part configured to transmit guide messages according to the results of the processing; and a data storage configured to store data such as numerical map data and an expected search time for each section distance.

The GPS receiver receives, from a GPS satellite, location information such as longitude and latitude, as well as time information. The sensor is composed of a direction detection sensor, a distance detection sensor, and a speed detection sensor that detect current azimuth distances and speed of the food truck on the basis of location and time information received from the GPS receiver. The direction detection sensor detects a current bearing of the food truck, the distance detection sensor detects a mileage by interworking with a travel meter of the food truck, and the speed detection sensor detects a current speed by interworking with a speed meter of the food truck.

In addition, the data storage stores various application programs used for navigation, and stores various information including: user's location information, numerical map information, road information, intersection information, expected search time for each section distance, and the like. Here, the numerical map information is a digital numerical map based on GIS and has information about location points such as longitude and latitude, and when determining a current location on the basis of received location information and using the current position on a numerical map, the location information of numerical map information is used by applying a technique including map matching, etc., as data mapping.

In addition, the input part is composed of a touch screen, keypad, and the like interworked with an input processor module of the controller 220, and when configured as the touch screen, the touch screen interworks with a display device of the display part. In addition, the display part is the display device connected to an image processor module of the controller 220, and when configured as a touch screen, the touch screen interworks with the input part.

Meanwhile, In addition, on the basis of one piece of order information on one of orderer requests including: a request for an expedited delivery within a predetermined time (e.g., 20 minutes); a request for a postponed delivery beyond a predetermined amount of time (e.g., 40 minutes); and a request for separately delivering a food menu item to multiple delivery locations (e.g., Building 301, Room 101/Building 302, Room 705), the route determination part 206 may determine an optimal delivery route for the ordered food menu item by applying conditions about straight roads, curved roads, traffic lights, intersections, and speed bumps.

FIG. 6 is a view showing an example of displaying front images through a rear display part in each food truck according to the exemplary embodiment of the present invention.

Referring to FIG. 6, each food truck 200 according to the present invention may obtain the front images by photographing the front road of the food truck through the front camera 204, and may display, on the rear display part 224, the obtained front images regarding road conditions ahead.

Therefore, drivers of vehicles following each food truck 100 on the roads may recognize the road conditions in front of each food truck 100, and when there is no vehicle on the opposite lane ahead, the drivers may overtake each food truck 100 and move to the front road.

Figure 20:
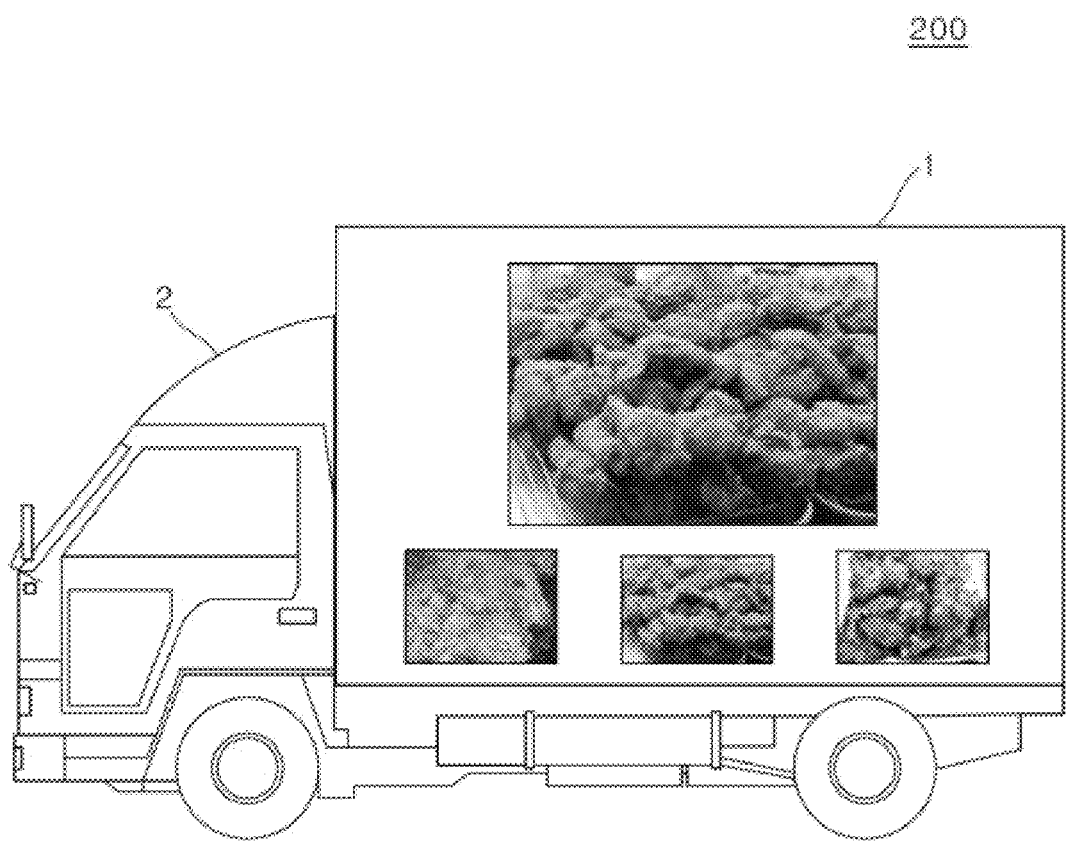
FIG. 20 is a view showing an example that describes a cooking process of food menu items through a side window of each food truck while moving according to the exemplary embodiment of the present invention.

In addition, each food truck 200 according to the present invention may obtain cooking images by photographing a process of cooking food menu items through the cooking camera 218, and as shown in FIG. 20, may display the cooking images through the display part 224 installed on the sides or rear of each food truck. In this case, the food menu items and order contact information may also be displayed on a screen. FIG. 20 is a view showing an example that describes a cooking process of food menu items through a side window in each food truck while moving according to the exemplary embodiment of the present invention. That is, while each food truck is moving, people in the sidewalks around each food truck may make order requests for the corresponding food menu items while watching the cooking status of the food menu items displayed on the side of each food truck.

In addition, by alternating with the road front images and cooking images, each food truck 200 according to the present invention may display other useful information such as the cooking status of the ordered food menu items, movement status of delivery transport routes, traffic situations, weather, etc.

In addition, people riding in respective vehicles following each food truck 200 watch the cooking images displayed on the rear display part of each food truck, and desire to eat so that the people may order the food menu items of the corresponding cooking images with order contact information presented on the screen.

Meanwhile, by alternating with the road front images and the cooking images, each food truck 200 according to the present invention may display other useful information such as the cooking status of the ordered food menu items, the moving status of the delivery transport routes, the traffic situations, the weather, etc.

Figure 7:
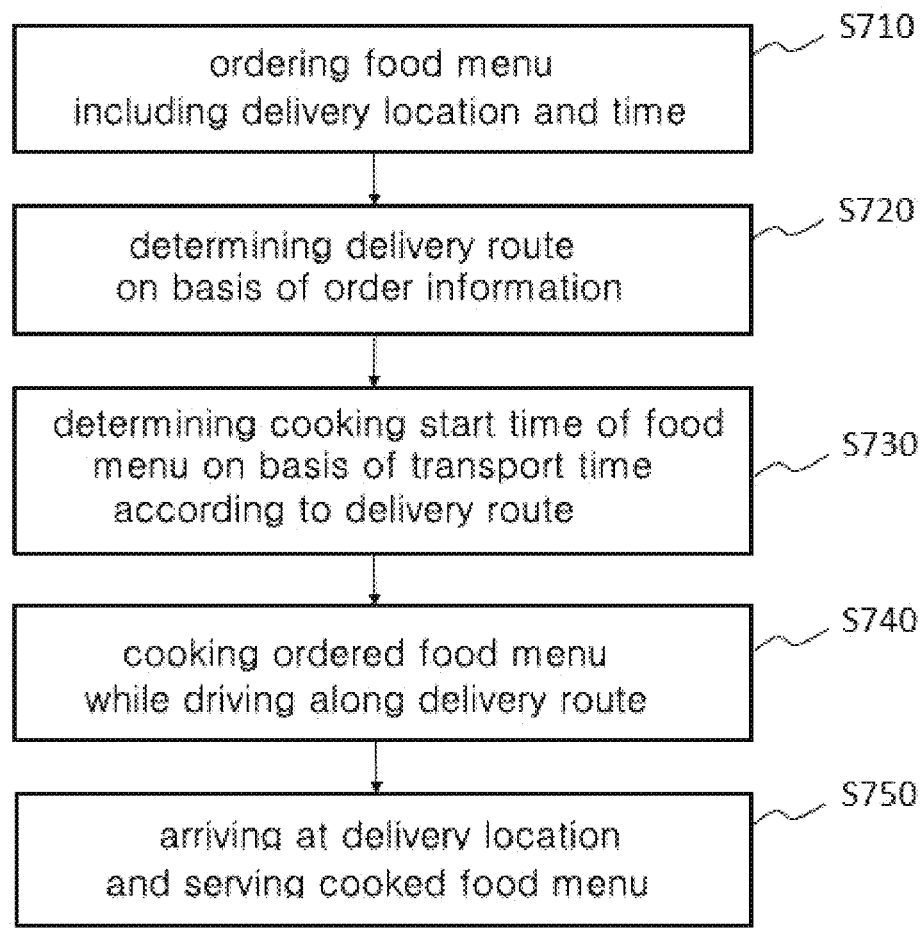
FIG. 7 is a view showing an operation flowchart for illustrating a method of delivering cooked food of each food truck according to the exemplary embodiment of the present invention.

FIG. 7 is a view showing an operation flowchart for illustrating a method of delivering cooked food of each food truck according to the exemplary embodiment of the present invention.

Referring to FIG. 7, in step S710, each food truck 200 according to the exemplary embodiment of the present invention receives an order for a food menu item from the order reception part 202 and generates order information.

In this case, as shown in FIG. 8, on the basis of the order information received through the order reception part 202, the controller 220 may generate an orderable menu, available delivery time, and quantity according to another order status and the location of a current food truck, and may control to take a food menu item order through the order reception part 202 according to the generated orderable menu and the available delivery time and quantity. FIG. 8 is a view showing an example of receiving orders for food menu items according to available delivery times and quantities in an order reception part according to the exemplary embodiment of the present invention. As shown in FIG. 8, it may be seen that in one of the food trucks 200 according to the exemplary embodiment of the present invention, orders may be available up to two servings of fried thicken, four servings of spicy sauce thicken, and four servings of soy sauce chicken at an order time of 18:40. In addition, at 19:10, it may be seen that only one person may be able to order fried thicken. For example, delivery available quantity and time may be displayed at 10-minute intervals.

According to the exemplary embodiment of the present invention, each food truck 200 and an order application company are technically affiliated with each other in business so that an orderer may order through an order application installed on a smartphone of the orderer. Therefore, anyone in the general public may order by type and quantity for food menu items shown in FIG. 8 with each food truck 200 according to the present invention through the order application.

Here, when the order is completed, each food truck 200 according to the exemplary embodiment of the present invention may transmit the order details by means of an orderer notification message to an orderers' terminal as shown in FIG. 9. FIG. 9 is a view showing an example of transmitting order details by using a notification message from each food truck to the orderers' terminal according to the exemplary embodiment of the present invention. As shown in FIG. 9, each food truck 200 according to the exemplary embodiment of the present invention informs, by sending the notification message, the orderers' terminal of the order details including the order number, order time, orderer, address, cooking menu, price, delivery scheduled time, and the like so that by the time the cooking is finished, the orderer may be provided with the corresponding food menu items.

Next, in S720, the route determination part 206 determines delivery routes on the basis of the order information.

Here, the order information may be one of orderer requests including: a request for an expedited delivery within a predetermined time; a request for a postponed delivery beyond a predetermined amount of time; and a request for separately delivering the food menu item to multiple delivery locations.

In addition, by applying conditions about the straight roads, curved roads, traffic lights, intersections, and speed bumps, the route determination part 206 may determine an optimal delivery route for the ordered food menu item on the basis of the order information of one of the plurality of requests described above.

Next, in step S730, the cooking determination part 208 determines a cooking start time of the ordered food menu item on the basis of movement time along the delivery route.

For example, in a case where a delivery time is 30 minutes, when it takes 20 minutes for starting cooking, frying chicken ingredients, adding additional ingredients, and packing, the cooking determination part 208 may set the cooking start time to 20 minutes before the expected arrival time.

Next, in step S740, the processing and cooking part 216 cooks the ordered food menu item while the food truck moves along the delivery route.

That is, while the food truck moves along the delivery route, the processing and cooking part 216 may cook the ordered food menu item, for example, in a method of frying chicken ingredients at 100° C. for seven minutes and at 80° C. for three minutes.

Figure 10:
FIG. 10 is a view showing an example of informing in real time cooking status and delivery status for an order menu in each food truck according to the exemplary embodiment of the present invention.

In this case, as shown in FIG. 10, the controller 220 may provide the status of cooking of the ordered food menu item and the expected arrival time to the orderers' terminal. FIG. 10 is a view showing an example of informing cooking status and delivery status for an order menu in each food truck in real time according to the exemplary embodiment of the present invention. As shown in FIG. 10, each food truck 200 according to the exemplary embodiment of the present invention may display, on a map image, information on current cooking while moving to a delivery location, and provide the information to the orderers' terminal. Accordingly, the orderer may recognize the cooking and delivery conditions, and may prepare to receive the food menu item according to the time when the cooking is finished.

In addition, when there is an order to be delivered, each food truck 200 of the present invention searches for an optimal route for moving to the delivery location in consideration of the traffic situation at the time of delivery and starts to cook while moving. In this case, the cooking start time is calculated so that the cooking is finished upon arrival in consideration of the time required for the cooking while moving to the delivery location, thereby starting the cooking at the calculated time.

In addition, while the food truck moves along the delivery route and the processing and cooking part 216 cooks the ordered food menu item, the controller 220 may photograph road front sights through the front camera 204 installed in the food truck and control the photographed front sight images to be displayed through the rear display part 224 installed at the rear of the food truck.

In addition, while the food truck moves along the delivery route and the processing and cooking part 216 cooks the ordered food menu item, the controller 220 may photograph the cooking process through the cooking camera 218 installed in the food truck and control the photographed cooking process images to be displayed through the rear display part 224 installed at the rear of the food truck.

Next, in step S750, the menu finish part 222 finishes and provides the cooked food menu item at the delivery location.

That is, the menu finish part 222 is, for example, to provide the finished food menu item by adding additional ingredients for the remaining 5 minutes to the chicken ingredients fried for 25 minutes and packaging the chicken ingredients.

After the delivery of the food menu item is completed, each food truck 200 according to the exemplary embodiment of the present invention may receive customer satisfaction rating with a delivery and food from the orderers' terminal. That is, the controller 220 may control to transmit a message inquiring about customer satisfaction rating with the ordered food menu item on the basis of the order information to the orderers' terminal, and to transmit, to the orderers' terminals with feedback, discount coupons that may be used for the next order.

When there is no order to be delivered, each food truck 200 according to the present invention may select, on the basis of an existing order history, an optimal location for delivery once orders are placed, and then move to the optimal location. That is, based on the order information, the controller 220 learns a region and a time in which orders are generated a lot according to the order region and order time, and may control to set, as a movement destination, the region in which orders are generated a lot, and then move the food truck to the movement destination at the corresponding time.

In addition, the food truck 200 according to the present invention may store the order history such as order locations, order quantities, order menus, and the like in a database, so as to calculate probability of locations with a high likelihood of placing orders, and may move to a location where to respond immediately once orders are placed.

In addition, each food truck 200 according to the present invention may set ratings according to the cumulative number of orders and usage amount for each orderer on the basis of the order information and periodically provide, to the orderers' terminals, discount coupons having different discount rates according to the ratings that has been established for each orderer.

Figure 11A:
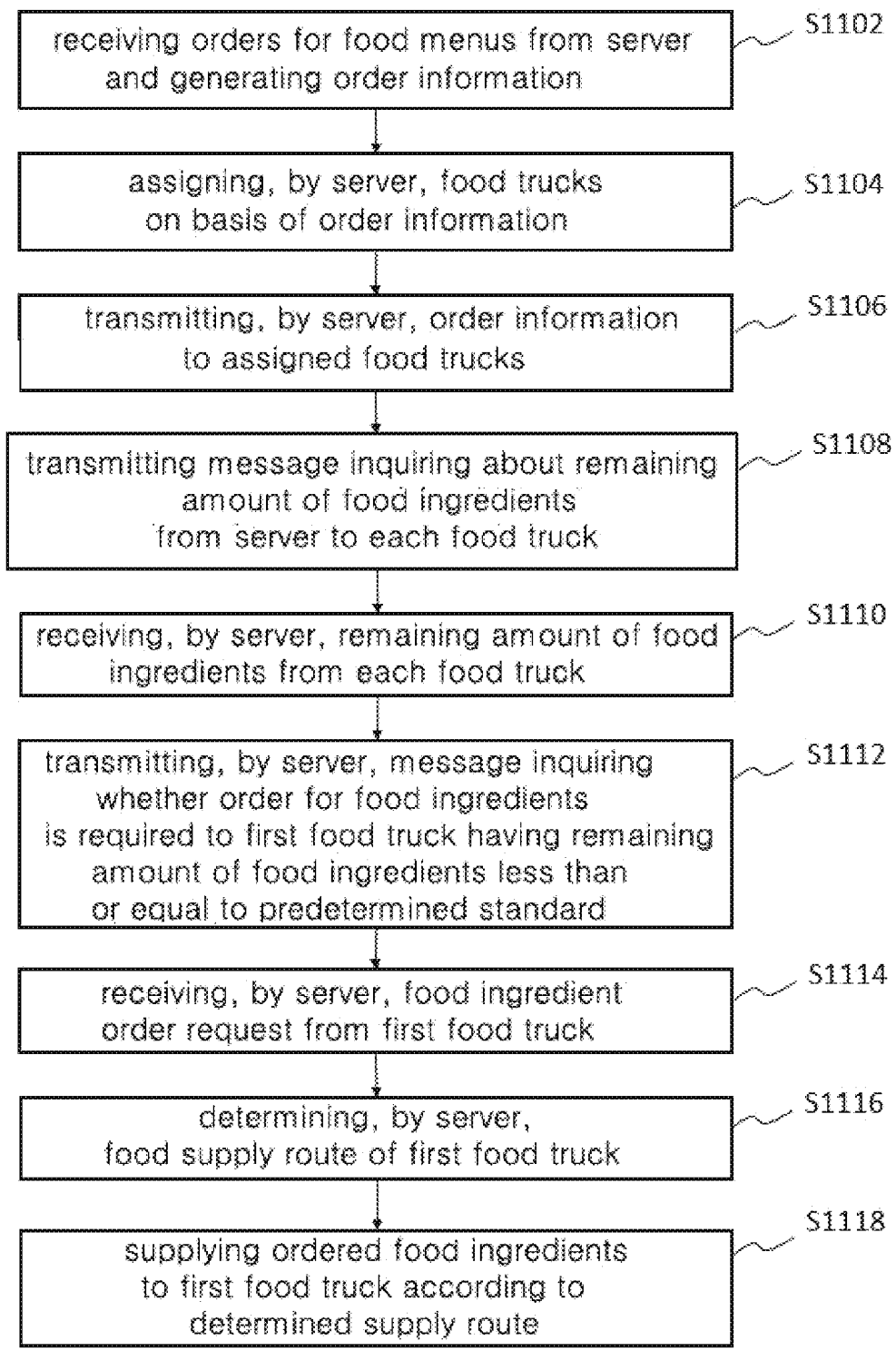
FIGS. 11a and 11b are views respectively showing operation flowcharts for illustrating a franchise food truck integrated management method according to the exemplary embodiment of the present invention.

FIG. 11a is a view showing an operation flowchart for illustrating a franchise food truck integrated management method according to the exemplary embodiment of the present invention.

In the exemplary embodiment of the present invention, the above-described food ingredient management part 120 will be described referring to as a server 120.

Referring to FIG. 11a, in the franchise food truck integrated management system 100 according to the exemplary embodiment of the present invention, first, in step S1102, the server 120 receives a food menu item order from a consumer terminal to generate order information.

That is, as shown in FIG. 9, according to a food menu item order from the consumer terminal through a delivery order application or an application related to the food truck use, the server 120 generates order information including: order history, orderer, order time, delivery address, food menu item, price, expected delivery time, etc.

Next, in step S1104, the server 120 assigns a food truck on the basis of the order information.

In a state where location information of each food truck is previously received from each food truck and stored in a database (DB), on the basis of delivery addresses according to the order information, the server 120 assigns, as a delivery food truck, a nearest food truck or a food truck positioned at a corresponding location during the delivery movement time among the food trucks distributed nearby.

Next, in step S1106, the server 120 transmits the order information to the assigned food truck.

That is, the server 120 transmits, to the food truck assigned as the delivery truck for the ordered food menu item, the order information including: order history, orderer, order time, delivery address, food menu item, price, and the like so as to allow the corresponding food truck to cook and deliver the order menu.

In this case, when the price for a food menu item has already been paid from the consumer terminal when taking orders for the food menu item, the server 120 subsequently distributes expenses with the assigned food truck according to mutually agreed distribution ratios, so as to share profits with each other.

Next, in step S1108, the server 120 transmits a message inquiring about the remaining amount of food ingredients to each food truck including the assigned food truck.

That is, the server 120 inquires whether there are enough food ingredients to cook the food menu items in the assigned food truck, and also transmits, to each food truck 162 to 164, a message inquiring about the remaining amount of food ingredients of other food trucks.

Then, in step S1110, the server 120 receives the remaining amount of food ingredients from each food truck 162 to 164.

In this case, the server 120 may receive the remaining amount of food ingredients together with location information from each food truck 162 to 164. In addition, the server 120 may list the remaining amount of food ingredients received from each food truck in descending order from the largest amount of the remaining amount to the least.

Next, in step S1112, the server 120 inquires whether a food ingredient order is required to a first food truck 162 whose remaining amount of food ingredients, the remaining amount being received by the server, is less than or equal to a predetermined standard.

That is, the server 120 transmits the message inquiring about the remaining amount of food ingredients to the first food truck 162.

Next, in step S1114, the server 120 receives a food ingredient order request from the first food truck 162.

That is, as the first food truck 162 cooks food menu items according to the order information, the food ingredients stored in the ingredient storing part 210 are consumed, for example, there are only a few food ingredients left to make three food menu items, and thus the first food truck 162 may order a quantity of food ingredients to make 10 food menu items. Accordingly, the first food truck 162 transmits, to the server 120, a food ingredient order request for enough food ingredients to make 10 food menu items.

Next, in step S1116, the server 120 determines a food ingredient supply route that finds a way to the first food truck 162.

That is, when determining the food ingredient supply route that finds a way to the first food truck 162, the server 120 may determine whether to use a way including: supplying the food ingredients according to the food ingredient order request by loading from the food ingredient storage 130 and then loading onto a food ingredient delivery vehicle 170; supplying the food ingredients by the first food truck 162 coming to the food ingredient storage 130 and taking the food ingredients according to the food ingredient order request; or supplying the food ingredients through a second food truck 164 located closest to the first food truck 162 or through a third food truck where the remaining amount of food ingredients is greater than or equal to a predetermined standard.

For example, in a case of having no time to go to take food ingredients due to cooking and delivering of the food menu item according to the current order information, the first food truck 162 may request to supply the food ingredients through the food ingredient delivery vehicle 170.

Therefore, the server 120 controls to transmit the food ingredient order request of the first food truck 162 to the food ingredient delivery vehicle 170 so that the food ingredient delivery vehicle 170 comes to the food ingredient storage 130 to load the order-requested food ingredients, thereby supplying the food ingredients to the second food truck 164.

In addition, when determining the food ingredient supply route that finds a way to the first food truck 162, the server 120 may list the remaining amount of food ingredients in descending order, and may transmit the location information of the first food truck 162 and a message requesting urgent assistance for the supply of food ingredients and cooking of the food menu item to the second food truck 164 that is located closest to the first food truck 162 and provided with the remaining amount of food ingredients above a predetermined standard.

Next, in step S1118, the order-requested food ingredients are supplied to the first food truck according to the determined supply route.

In this case, when a second food truck 164 located closest to the first food truck 162 goes to the location of the first food truck 162 and provides urgent assistance for supplying food ingredients and cooking food menu item, the server 120 may respectively send, to the first food truck 162 and the second food truck 164, messages informing the distribution ratios of the profits generated by the urgent assistance for the supplying of the food ingredients and cooking of the food menu item.

Accordingly, the first food truck 162 and the second food truck 164 may distribute the profits generated by the urgent assistance for the supplying of the food ingredients and cooking of the food menu item according to the predetermined distribution ratios.

In the above-described exemplary embodiment, the server 120 inquires about the remaining amount of food ingredients to each food truck 200 and supplies the food ingredients, but the exemplary embodiment is not limited thereto. The server 120 may assign order details to each food truck 200 and monitor the delivery status, so as to identify the amount of inventory in each food truck 200, whereby it is possible to predict and supply the required amount of food ingredients.

Figure 11B:
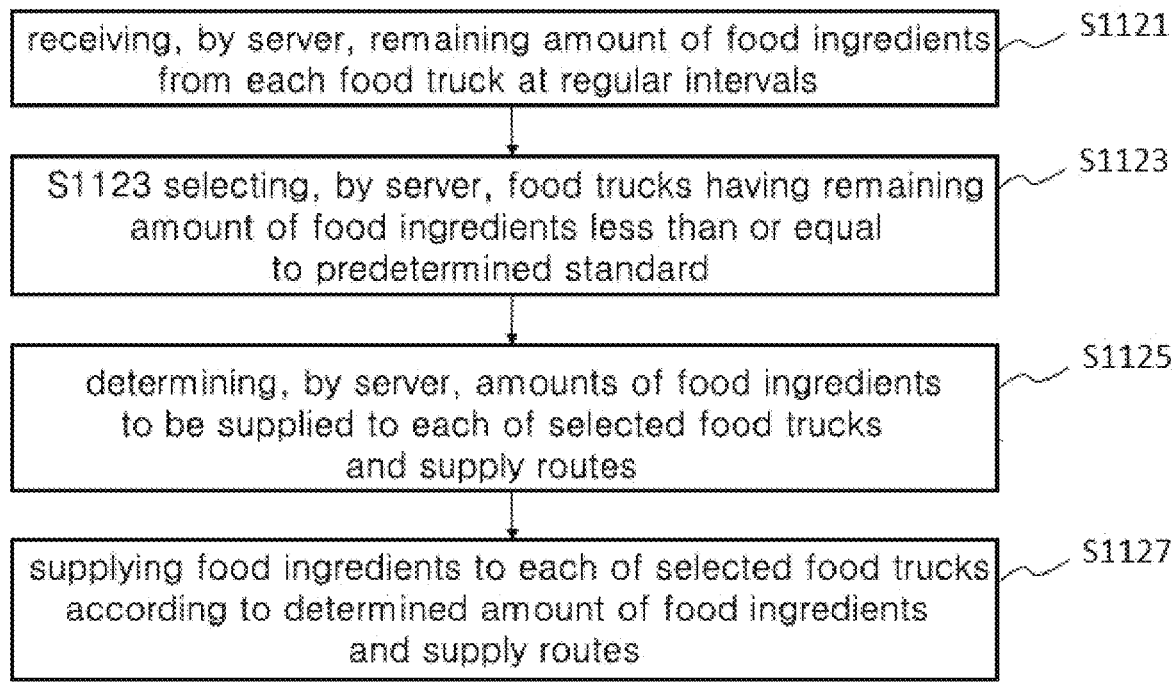

FIG. 11b is a view showing an operation flowchart for illustrating a franchise food truck integrated management method according to the exemplary embodiment of the present invention.

In another exemplary embodiment of the present invention, the above-described food ingredient management part 120 will be described referring to as a server 120.

Referring to FIG. 11b, in the franchise food truck integrated management system 100 according to the exemplary embodiment of the present invention, first, in step S1121, the server 120 receives a remaining amount of food ingredients from each food truck at regular intervals.

In this case, the server 120 receives, from each food truck, the remaining amount of food ingredients together with its location information. Naturally, the server 120 may receive not only the location information but also other information related to the food trucks, such as contact information and food menu items for sale.

Next, in step S1123, the server 120 selects food trucks with the remaining amount of less than or equal to a predetermined standard on the basis of the received remaining amount of ingredients.

In this case, the server 120 may list the remaining amount of food ingredients of each food truck in descending order, and select food trucks with the remaining amount of food ingredients below the predetermined standard.

Next, in step S1125, the server 120 determines the amount of food ingredients to be supplied to each of the selected food trucks and the supply routes.

At this time, the server 120 may inquire whether a food ingredient order is required for each of the selected food trucks, and select, as the requesting food trucks, food trucks with a food ingredient order request from among each of the selected food trucks, and then determine supply routes and amounts of food ingredients to be supplied to the selected food trucks.

Next, in step S1127, the food ingredients are supplied to each of the selected food trucks according to the determined amount of food ingredients and the supply routes.

For example, the food ingredients according to the food ingredient order request are loaded from the food ingredient storage 130 and supplied to the food ingredient delivery vehicle 170 in a loaded state, or the food ingredients are supplied by the requesting food truck 162 coming to the food ingredient storage 130 and taking the food ingredients according to the food ingredient order request, or the food ingredients are supplied through the second food truck 164 located closest to the requesting food truck 162, or through the third food truck in which the remaining amount of food ingredients is greater than or equal to the predetermined standard.

Meanwhile, the food ingredient management part 120 according to the present invention may store, in a database, order history such as food truck locations, order locations, order quantities, and order menus for each food truck 200, predict consumption of food ingredients for a specific date and place on the basis of the order information, and check whether the food truck needs to order food ingredients to supply the food ingredients right away.

In addition, the food ingredient management part 120 identifies the supply status of the food ingredients and other consumables supplied from the food ingredient storage 130 to each food truck, and maintains an appropriate inventory so that the food ingredient inventory is not out of stock.

Figure 12:
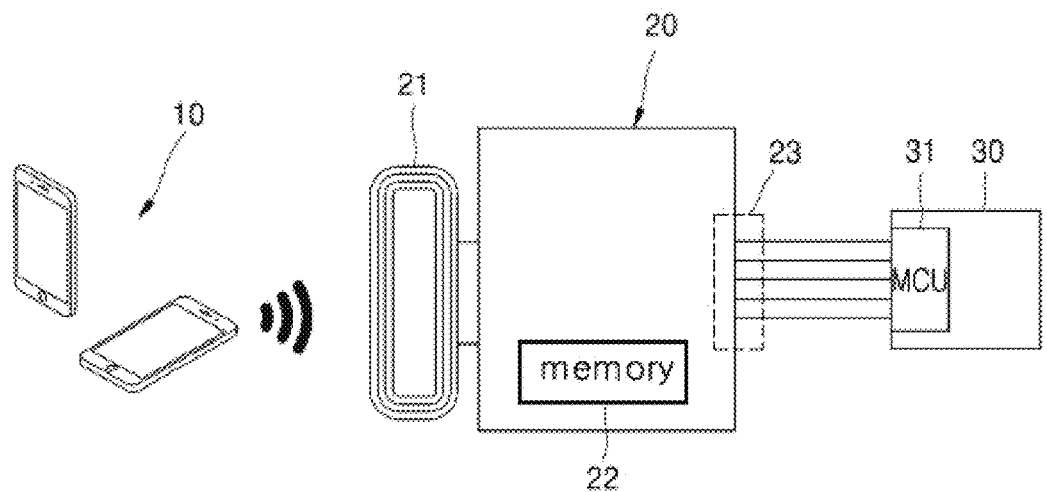
FIG. 12 is a view showing an example of executing a food ingredient order request through a dual interface NFC tag in each food truck according to the exemplary embodiment of the present invention.

FIG. 12 is a view showing an example of executing a food ingredient order request through a dual interface NFC tag in each food truck according to the exemplary embodiment of the present invention.

Referring to FIG. 12, each food truck 200 according to the exemplary embodiment of the present invention may include a smart terminal 10, a dual interface NFC tag 20, and an electronic device 30.

The smart terminal 10 is a terminal that is carried by a driver or a user who drives a food truck 200, and is a terminal that performs wireless communication with the dual interface NFC tag 20.

The smart terminal 10 may also be referred to as a subscriber unit, a subscriber station, a mobile station, a mobile, a remote station, a remote terminal, a mobile device, a user terminal, a wireless communication device, a user agent, a user device, or a user equipment (UE).

The smart terminal 10 may be a cellular phone, a wireless phone, a session initiation protocol (SIP) phone, a wireless local loop (WLL) station, a personal digital assistant (PDA), a handheld device with wireless access capability, a computing device, or another processing device connected to a wireless modem.

However, the smart terminal 10 should not be limited to these terms. The smart terminal 10 should be understood as any device including an NFC module that is an active device for wireless short-range communication with the dual interface NFC tag 20. The smart terminal 10 performs short-range wireless communication with the dual interface NFC tag 20 through an antenna 21 of the dual interface NFC tag 20.

The dual interface NFC tag 20 performs short-range wireless communication with the smart terminal 10 and performs wired communication with the electronic device 30. For example, wired communication includes serial communication, USB communication, I2C communication, SPI communication, and the like.

The dual interface NFC tag 20 includes an antenna 21 for an RF interface, a memory 22 for data storage, and ports 23 for wired communication.

The antenna 21 for the RF interface is to transmit and receive data by making signals that are transmitted according to radio frequencies in the air as if the signals are transmitted through connected wires, and the antenna 21 supports wireless short-range (e.g., 10 cm) communication.

In general, the antenna 21 is composed of a loop antenna, and the loop antenna may be implemented as a PCB, FPCB, or general conductive wire.

The memory 22 for data storage is generally a non-volatile memory (NVM), for example, and may be an EEPROM (Electrically Erasable Programmable Read-Only Memory). When implemented as the EEPROM, internal data is erased by applying an electrical signal to the memory 22, so a dedicated eraser for data erasing is not required, and writing and erasing may be performed by using a single writer. Such an EEPROM may have a limit of the number of repeated writes of about one million times.

Ports 23 for wired communication may include: a port (i.e., first port) configured to recognize tagging of a smart terminal 10 for a dual interface NFC tag 20; and a port (i.e., second port) configured to recognize writing to the dual interface NFC tag 20 from the smart terminal 10.

The first port configured to recognize the tagging of the smart terminal 10 for the dual interface NFC tag 20 may include, for example, an Energy Harvest Field Detection, hereinafter referred to as EH_FD) port. The second port configured to recognize the writing to the dual interface NFC tag 20 from the smart terminal 10 may include, for example, a Radio Frequency Write In Progress (hereinafter referred to as RF_WIP) port.

In addition, the ports 23 for wired communication may also include ports for receiving data from the electronic device 30. For example, in the case of I2C wired communication, the electronic device 30 may write data to the memory 22 of the dual interface NFC tag 20 through wired communication through a serial dock (SCL) port and/or a serial data (SDA) port. Here, in the food truck 200, the electronic device 30 may be implemented as a device including an order reception part 202, a route determination part 206, a cooking determination part 208, and a controller 220. In this case, as shown in FIG. 12, the controller 220 may be implemented with an MCU 31.

In the food truck 200 according to the exemplary embodiment of the present invention, a food ingredient order request may be made, to the dual interface NFC tag 20, by tagging a smart terminal 10 that is carried by a driver or a user to request a food ingredient order.

In this case, operation characteristics of the first port for recognizing the tagging of the smart terminal 10 for the dual interface NFC tag 20 is as follows.

The dual interface NFC tag 20 may receive operating power from the smart terminal 10. The smart terminal 10 generates an electromagnetic field, and when the smart terminal 10 approaches the dual interface NFC tag 20 within a predetermined range, the generated electromagnetic field operates as operating power of the dual interface NFC tag 20. The first port is a port configured to detect the presence or absence of the electromagnetic field of the above-described smart terminal 10, and when the presence of the electromagnetic field is confirmed, a signal waveform is toggled up.

Meanwhile, since the dual interface NFC tag 20 is connected to the electronic device 30 through wired communication, in some cases, the operating power may be received from the electronic device 30 through a wired line.

The operation characteristics of the second port for recognizing the writing for the dual interface NFC tag 20 from the smart terminal 10 are as follows.

While the dual interface NFC tag 20 is receiving the operating power from the smart terminal 10, when the smart terminal 10 performs an operation of writing to the memory 22 of the dual interface NFC tag 20, the signal waveform that has been toggled up is toggled down, and after a predetermined time has elapsed, the signal waveform is toggled up again. The second port may detect that the smart terminal 10 has performed the writing to the memory of the dual interface NFC tag 20 by detecting that the toggle-up signal waveform is toggled down and then toggled up again.

The ports 23 for wired communication and including the above-described first and second ports support wired communication with the electronic device 30. Specifically, the ports 23 for wired communication are connected to the control unit (i.e., MCU 31) of the electronic device 30 through a wired line.

The electronic device 30 is a device installed inside each food truck 200, and may be, for example, a device installed at a position convenient for tagging by a driver or a user by using the smart terminal 10. The electronic device 30 includes a control unit 31, and the control unit 31 performs wired communication with the dual interface NFC tag 20.

As described above, the smart terminal 10 may perform writing and reading through wireless short-range communication with respect to the memory 22 of the dual interface NFC tag 20, and the electronic device 30 may perform writing data to and reading the data from the memory 22 of the dual interface NFC tag 20 through wired communication. That is, conceptually, the smart terminal 10 and the electronic device 30 share the memory of the dual interface NFC tag with each other. For example, the electronic device 30 may receive, from the server 120, a message for inquiring about the remaining amount of food ingredients through wireless communication, and may write the remaining amount to the memory 22 of the dual interface NFC tag 20, and after writing, by reading through wireless short-distance communication, the smart terminal 10 may be provided with information on an inquiry of the remaining amount of food ingredients and whether or not an order for food ingredients is required, the information being stored in the memory 22.

Conversely, by the tagging operation performed by a driver or user, the smart terminal 10 may write a food ingredient order request to the memory 22, and the electronic device 30 may transmit the written food ingredient order request data to the server 120 through a communication network.

However, since the smart terminal 10 and the electronic device 30 communicate with each other in a memory sharing method rather than a traditional communication method, the electronic device 30 requires a technology capable of recognizing whether operations are performed, the operations including: tagging by a smart terminal 10; releasing the tagging; writing data by the smart terminal 10; and the like. Accordingly, the present invention provides a method for the electronic device 30 to recognize the operations of the smart terminal 10.

According to the present invention, by generating an interrupt for the control unit 31 of the electronic device 30, the electronic device 30 may recognize the type of operation and whether the smart terminal 10 is operated. For the interrupt, the present invention uses a combination of a first port for recognizing tagging of the smart terminal 10 and a second port for recognizing writing to the dual interface NFC tag 20 from the smart terminal 10. As described above, the first port may typically be an EH_FD port, and the second port may typically be an RF_WIP port.

As control signals for controlling the enable and disable of a pull-up resistor of the second port, the combination method of the first port and the second port uses output of the first port. In order to describe the combination method of the first port and the second port, FIGS. 17 and 18 will be referred to first.

Figure 17:
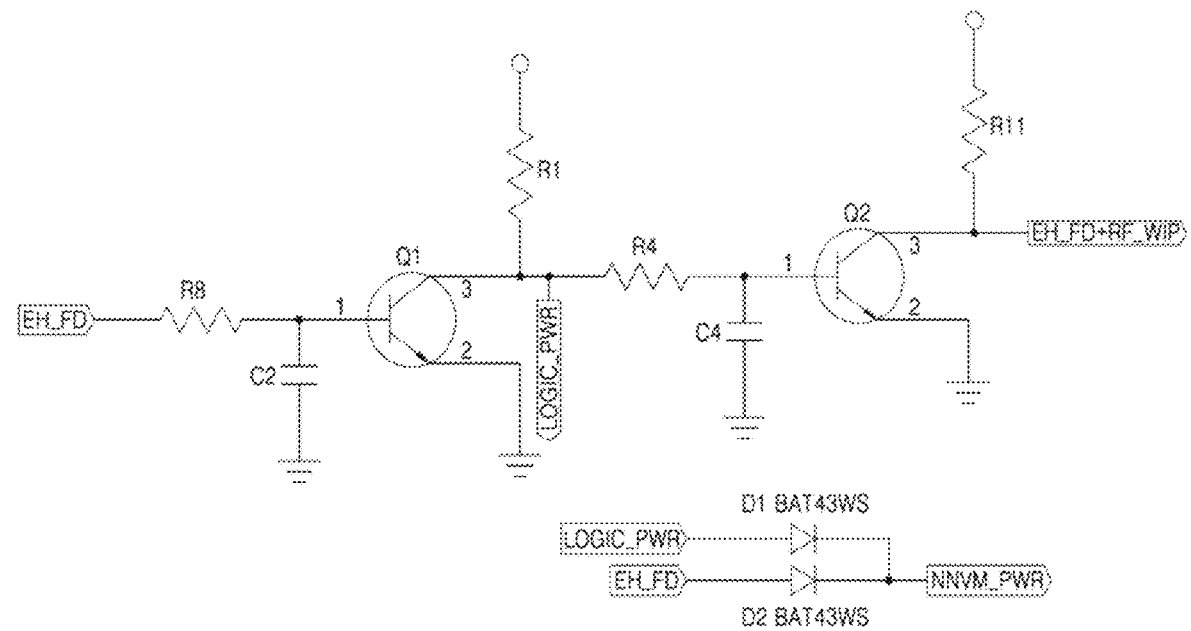
FIGS. 17 and 18 are circuit diagrams for illustrating a combination of a first port and a second port for the dual interface NFC tag according to the exemplary embodiment of the present invention.
Figure 18:
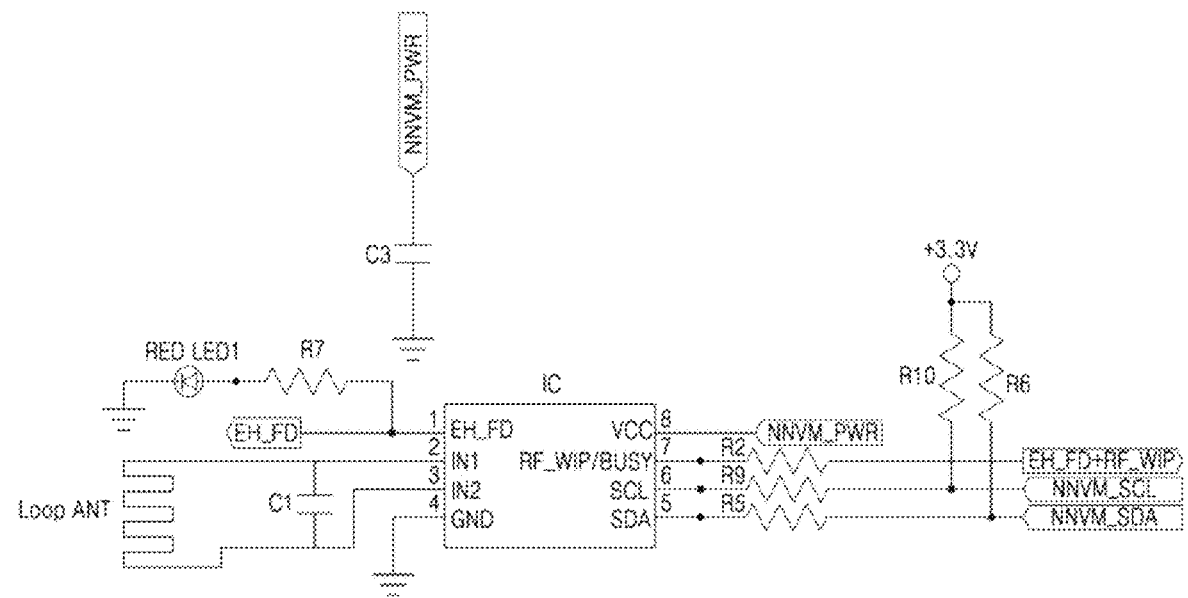

FIGS. 17 and 18 are circuit diagrams for illustrating the combination of the first port and the second port for the dual interface NFC tag according to the exemplary embodiment of the present invention.

In FIGS. 17 and 18, it will be described that the first port is the EH_FD port and the second port is the RF_WIP port.

When the smart terminal 10 is tagged with the dual interface NFC tag 20, an IC of the dual interface NFC tag 20 is powered by electromagnetic field generated by the smart terminal 10. In FIGS. 17 and 18, the generated power is output to EH_FD of the IC of the dual interface NFC tag 20. The output of EH_FD is input to a VCC port of the IC of the dual interface NFC tag 20 and may be used as operating power, and may also be used as a signal for recognizing a state that the smart terminal 10 is tagged.

An RF_WIP signal is a signal indicating that writing has been executed, wherein the output is toggled down from high to low and toggled up from low to high again after a predetermined period of time has elapsed in a case where data writing occurs in a state of tagging to the IC of the dual interface NFC tag 20 from the smart terminal 10.

Such an RF_WIP port is fundamentally an open-drain port. The open-drain port may not generate an output without a pull-up resistor outside the port due to its characteristics. Here, RF_WIP is a signal that may not be generated when EH_FD is in a low state because writing operation is generated on an assumption that the smart terminal 10 is tagged. Therefore, in FIGS. 17 and 18, the EH_FD port and the RF_WIP port are combined with each other so that the enable of the pull-up resistor of the RF_WIP may be controlled according to the EH_FD signal. That is, in FIGS. 17 and 18, the RF_WIP output signal of the IC of the dual interface NFC tag 20 and the output signal of the GEN INT terminal are composed of EH_FD+RF_WIP, which is a combination of EH_FD and RF_WIP.

A resistor R11 of the output terminal of the GEN INT becomes a collector resistor of a transistor Q2 and the pull-up resistor of RF_WIP at the same time. In GEN INT, when EH_FD is low, the output terminal transistor Q2 is conductive so that the EH_FD+RF_WIP node is connected to GND, and thus R11 does not operate as the pull-up resistor. When EH_FD is high, the output terminal transistor Q2 is not conductive so that R11 may operate as a pull-up resistor and the EH_FD+RF_WIP node is in a high state, whereby it is possible to recognize that the smart terminal 10 is tagged. When data writing occurs from the smart terminal 10 in this state, the EH_FD+RF_WIP signal is toggled down from high to low for a predetermined time and then toggled up to high again, whereby it is possible to recognize that the writing operation has occurred.

Figure 13:
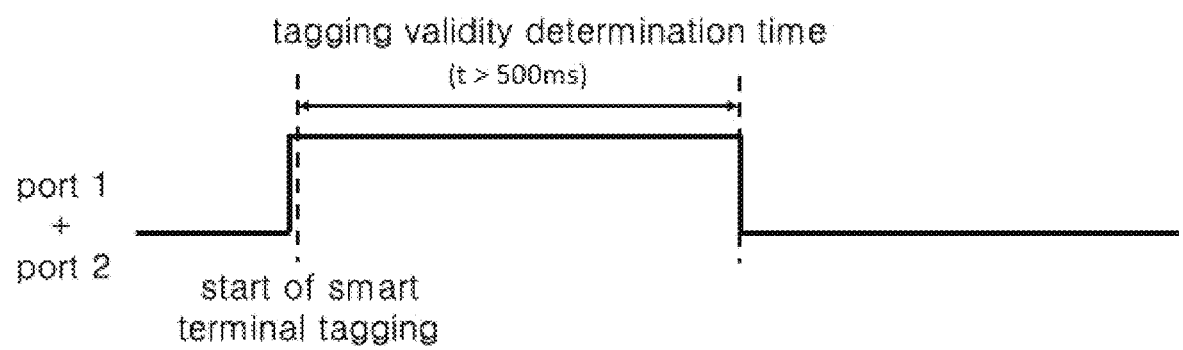
FIG. 13 is a view showing an interrupt for recognizing tagging of a smart terminal for the dual interface NFC tag according to the exemplary embodiment of the present invention.

FIG. 13 is a view illustrating an interrupt for recognizing tagging of the smart terminal for the dual interface NFC tag according to the exemplary embodiment of the present invention.

As described above, as an interrupt signal for the control unit 31 of the electronic device 30, a combined signal in which signals of the first port and the second port are combined with each other is used. The first port is a port configured to recognize the tagging of the smart terminal 10 for the dual interface NFC tag 20 and may be, for example, the EH_FD port, and the second port is a port configured to recognize the writing to the dual interface NFC tag 20 from the smart terminal 10 and may be, for example, the RF_WIP port.

As shown in FIG. 13, when the combined signal of the first port and the second port is toggled up from low to high, and a predetermined time for determining the tagging validity elapses, the control unit 31 recognizes the tagging of the smart terminal 10 for the dual interface NFC tag 20.

The reason for introducing the predetermined time for determining the tagging validity is that the signal waveform is not stably toggled up during tagging of the smart terminal 10 and some degree of chopping occurs. Furthermore, since the tagging uses a non-contact RF method, possible occurrence of such chopping is greater than usual. Therefore, the present invention introduces the predetermined time for determining the tagging validity in order to detect only valid tagging. The predetermined time may be changed depending on a system setting or operating environment of the present system, but the predetermined time for determining the tagging validity may be 500 ms.

Figure 14:
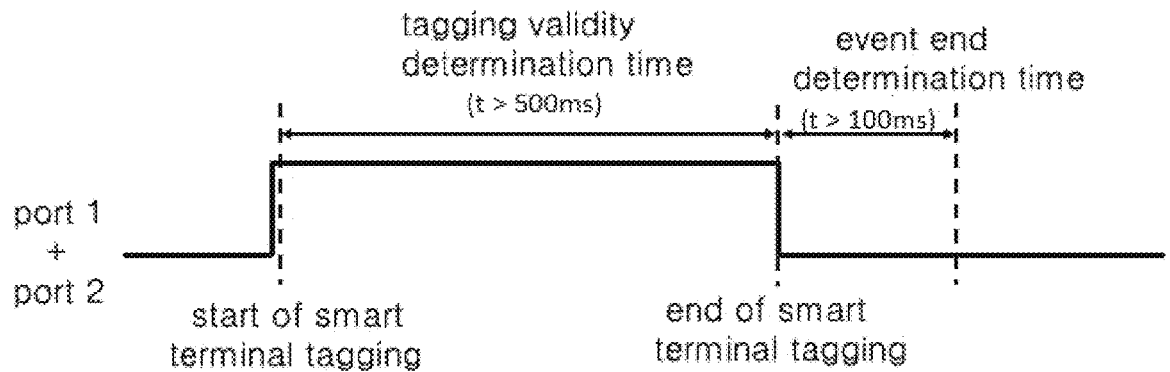
FIG. 14 is a view illustrating an interrupt for recognizing untagging of the smart terminal for the dual interface NFC tag according to the exemplary embodiment of the present invention.

FIG. 14 is a view illustrating an interrupt for recognizing untagging of the smart terminal for the dual interface NFC tag according to the exemplary embodiment of the present invention.

As described above, the combined signal of the first port and the second port is used as the interrupt signal for the control unit 31 of the electronic device 30. The first port is a port configured to recognize the tagging of the smart terminal 10 for the dual interface NFC tag 20 and may be, for example, the EH_FD port, and the second port is a port configured to recognize the writing to the dual interface NFC tag 20 from the smart terminal 10 and may be, for example, the RF_WIP port.

As shown in FIG. 14, when the combined signal of the first port and the second port is toggled down from high to low, and a predetermined time (e.g., 100 ms) for determining an event end has elapsed, the control unit 31 recognizes untagging of the smart terminal 10 for the dual interface NFC tag 20.

The reason for introducing the predetermined time for determining the event end is that the toggle-down of the signal waveform may occur due to various causes after the signal waveform is toggled up due to the tagging of the smart terminal 10. For example, the signal of the first port may be toggled down due to a temporary increase in a contact distance of the smart terminal 10, and even when the smart terminal 10 performs writing to the memory 22, the toggle-down may occur. Accordingly, the present invention introduces the predetermined time for determining the event end in order to detect only valid untagging. The predetermined time may be changed depending on the system setting or the operating environment of the present system, but the predetermined time for determining the event end may be 100 ms.

Figure 15:
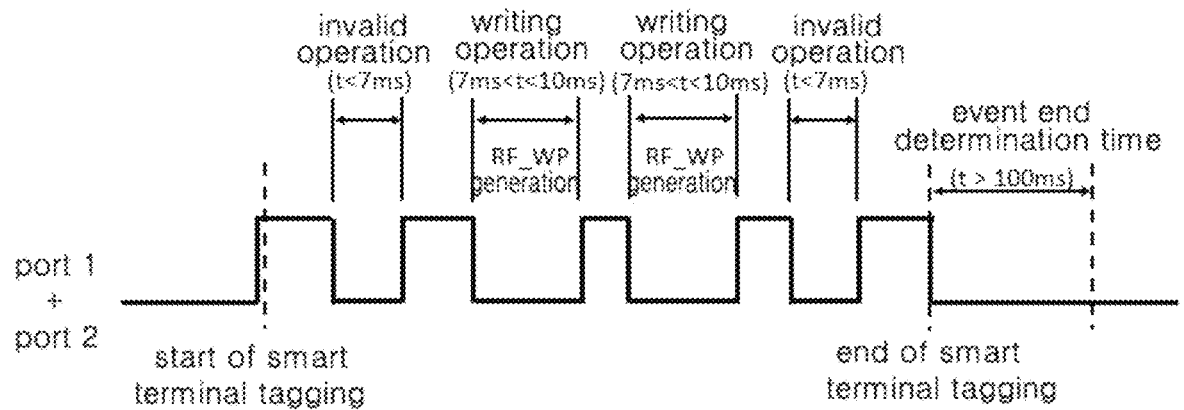
FIG. 15 is a view illustrating an interrupt for recognizing a write operation of the smart terminal for the dual interface NFC tag according to the exemplary embodiment of the present invention.

FIG. 15 is a view illustrating an interrupt for recognizing the writing operation of the smart terminal for the dual interface NFC tag according to the exemplary embodiment of the present invention.

As described above, the combined signal of the first port and the second port is used as the interrupt signal for the control unit 31 of the electronic device 30. The first port is a port configured to recognize the tagging of the smart terminal 10 for the dual interface NFC tag 20 and may be, for example, the EH_FD port, and the second port is a port configured to recognize the writing to the dual interface NFC tag 20 from the smart terminal 10 and may be, for example, the RF_WIP port.

As shown in FIG. 15, when the combined signal of the first port and the second port is toggled down from high to low, and then toggled up from low to high again within the predetermined period of time, the control unit 31 recognizes the operation of writing, by the smart terminal 10, to the memory 22 of the dual interface NFC tag 20.

The predetermined period of time may be a predetermined value, and may correspond to maintenance of the toggle-down that occurs when writing to the memory 22 of the smart terminal 10. The predetermined period of time may be changed depending on the system setting or the operating environment of the present system, but the predetermined period of time for recognizing the writing operation of the smart terminal 10 may be a period of time exceeding 7 ms and less than 10 ms.

In addition, as shown in FIG. 15, when the combined signal of the first port and the second port is toggled down from high to low and then toggled up from low to high again within a threshold time, the control unit 31 may recognize the operation as an invalid operation. For example, the smart terminal 10 may temporarily move away in a distance or the toggle-down may occur due to other noise, and when the period is within the threshold time, the control unit 31 does not recognize such a phenomenon as a meaningful operation, but recognizes the phenomenon as the invalid operation. The threshold time may be changed depending on the system setting or the operating environment of the present system, but the threshold time for recognizing the invalid operation may be 7 ms.

Figure 16:
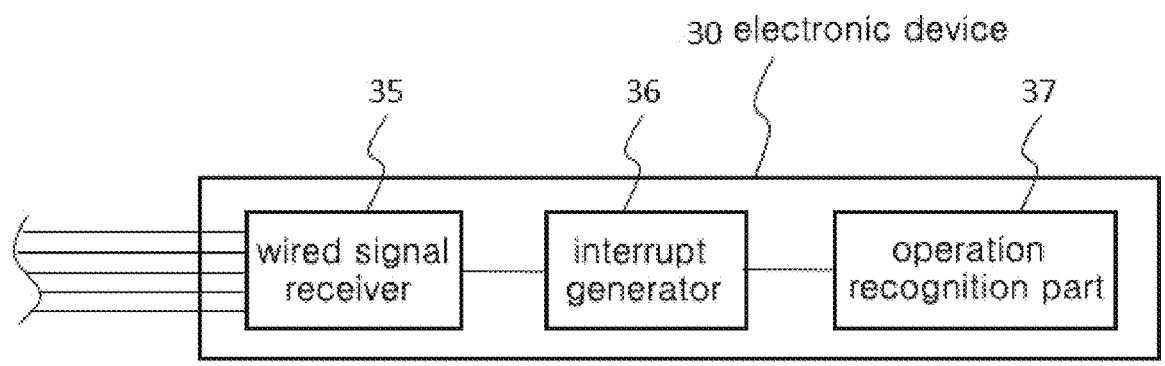
FIG. 16 is a view showing an example of communicating by wire between an electronic device and the dual interface NFC tag for short-range wireless communication with the smart terminal according to the exemplary embodiment of the present invention.

FIG. 16 is a view showing an example of communicating by wire between an electronic device and the dual interface NFC tag for short-range wireless communication with the smart terminal according to the exemplary embodiment of the present invention.

Referring to FIG. 16, the electronic device 30 in the present exemplary embodiment includes a wired signal receiver 35, an interrupt generator 36, an operation recognition part 37, and the like. The wired signal receiver 35, the interrupt generator 36, the operation recognition part 37, and the like in the present exemplary embodiment may all be integrated and implemented as the control unit (i.e., MCU 31) in the previous exemplary embodiment.

The electronic device 30 in the present exemplary embodiment performs wired communication with the dual interface NFC tag 20, and the dual interface NFC tag 20 includes: an antenna 21 for performing short-range wireless communication with the smart terminal 10; a memory 22 for data storage; and ports 23 for wired communication with the electronic device 30. The ports 230 for wired communication includes: a first port configured to recognize the tagging of the smart terminal 10 for the dual interface NFC tag 20; and a second port configured to recognize the writing to the dual interface NFC tag 20 from the smart terminal 10. For example, the first port may be an Energy Harvest Field Detection (EH_FD) port, and the second port may be a Radio Frequency Write In Progress (RF_WIP) port.

The wired signal receiver 35 receives wired signals from the dual interface NFC tag 20, and to this end, the wired signal receiver 35 is connected to the dual interface NFC tag 20 by a wired line. The wired signals received by the wired signal receiver 35 includes: a signal of the first port for recognizing the tagging of the smart terminal 10 for the dual interface NFC tag 20; and a signal of the second port for recognizing the writing to the dual interface NFC tag 20 from the smart terminal 10.

The interrupt generator 36 generates an interrupt signal on the basis of the signals received by the wired signal receiver 35. The interrupt generator 36 adopts a method of combining the first port signal and the second port signal in order to generate an interrupt signal. Specifically, the method of combining the first port signal and the second port signal uses output of the first port as a control signal for controlling the enable and disable of a pull-up resistor of the second port. FIG. 12 for illustrating the combination method of the first port and the second port is the same as described above.

The operation recognition part 37 recognizes the operation of the smart terminal 10 on the basis of the interrupt signal generated by the interrupt generator 36. Specifically, the operation of the smart terminal 10 recognized by the operation recognition part 37 includes: tagging for the dual interface NFC tag 20 of the smart terminal 10; untagging from the dual interface NFC tag 20 of the smart terminal 10; writing, by the smart terminal 10, to the memory 22 of the dual interface NFC tag 20; and performing an invalid operation.

When the interrupt signal is toggled up from low to high, and a predetermined time for determining tagging validity elapses, the operation recognition part 37 recognizes the operation as the tagging of the smart terminal 10 for the dual interface NFC tag 20. The predetermined time may be changed depending on a system setting or operating environment of the present system, but the predetermined time for determining the tagging validity may be 500 ms.

When the interrupt signal is toggled down from high to low, and a predetermined time for determining event end elapses, the operation recognition part 37 recognizes the operation as the untagging of the smart terminal 10 for the dual interface NFC tag 20. The predetermined time may be changed depending on the system setting or the operating environment of the present system, but the predetermined time for determining the event end may be 100 ms.

When the interrupt signal is toggled down from high to low, and then toggled up from low to high again within a predetermined period of time, the operation recognition part 37 recognizes the operation of writing, by the smart terminal 10, to the memory 22 of the dual interface NFC tag 20. The period of predetermined time may be changed depending on the system setting or the operating environment of the present system, but the period of predetermined time for recognizing the writing operation of the smart terminal 10 may be a period of time exceeding 7 ms and less than 10 ms.

When the interrupt signal is toggled down from high to low and then toggled up from low to high again within a threshold time, the operation recognition part 37 may recognize the operation as the invalid operation. The threshold time may be changed depending on the system setting or the operating environment of the present system, but the threshold time for recognizing the invalid operation may be 7 ms.

Meanwhile, in the control unit 31 of the electronic device 30 in each food truck 200, for example, when the smart terminal 10 is tagged once with the dual interface NFC tag 20, the control unit 31 recognizes the operation as a food ingredient order request in which the amount of food ingredients required to cook one food menu item is ordered, and when the smart terminal 10 is tagged twice with the dual interface NFC tag 20, the control unit 31 recognizes the operation as a food ingredient order request in which the amount of food ingredients required to cook two food menu items is ordered. That is, in the food truck 200, the control unit 31 of the electronic device 30 recognizes that one number of times according to the tagging of the smart terminal 10 is the amount of food ingredients required to cook a single food menu item.

In addition, according to the tagging for the predetermined time, the control unit 31 of the electronic device 30 in each food truck 200 may recognize a food ingredient order request according to the tagging time such as one second of tagging for the amount of food ingredients required to cook one food menu item and two seconds of tagging for the amount of food ingredients required to cook two food menu items.

In addition, when a tagging state is maintained for more than the predetermined period of time, for example, three seconds or more, the control unit 31 of the electronic device 30 in each food truck 200 may recognize the operation as a food ingredient order request for ordering the amount of food ingredients required to cook all food menu items to be cooked by the ordered food truck.

Meanwhile, the franchise food truck integrated management system 100 according to the present invention may include an order database (DB) configured to store and manage order information for receiving orders for food menu items from orderers through the order reception part 110. In this case, the order information may include orderer name, age, gender, phone number, address, date, time, weather, order menu, major events, customer satisfaction rating, and the like. Therefore, the franchise food truck integrated management system 100 according to the present invention may operate as an order information management system used for marketing by utilizing the order information stored in the order database (DB).

In addition, the franchise food truck integrated management system 100 according to the present invention may be operated as an excellent customer preference system by utilizing customer information and order information stored in the order database (DB).

For example, the franchise food truck integrated management system 100 according to the present invention may conduct a survey of initial customer's satisfaction rating with an order menu to provide discount coupons that may be used for the next order when customers provide feedback.

In addition, the franchise food truck integrated management system 100 according to the present invention may provide a service configured to share profits by assigning ratings to customers according to the customer's cumulative number of orders and usage amount, so as to periodically provide discount coupons with different discount rates according to the ratings, or so as to convert a regular customer into a partner by providing benefits such as priority order reception. In this case, it is possible to offer a service that provides, to the regular customers, free tasting tickets for trying samples when developing a new menu and then conducting a satisfaction survey so that whether to introduce the new menu is determined accordingly, thereby allowing each regular customer to experience the partnership.

Meanwhile, the franchise food truck integrated management system 100 according to the present invention may realize an artificial intelligence (AO-based order prediction system.

Figure 19:
FIG. 19 is a view illustrating an example in which the franchise food truck integrated management system according to the exemplary embodiment of the present invention is implemented as an artificial intelligence-based order prediction system.

That is, the franchise food truck integrated management system 100 according to the present invention utilizes the order database (DB), and as shown in FIG. 19, regions with relatively high orders are classified into major zones A to G by using the stored past order data. FIG. 19 is a view illustrating an example in which the franchise food truck integrated management system according to the exemplary embodiment of the present invention is implemented as an artificial intelligence-based order prediction system.

As shown in FIG. 19, when there is no order in any of the 10, 20, and 30 minute time slots based on the current date and time, the franchise food truck integrated management system 100 according to the present invention calculates, by time intervals, relative probability that orders are to be placed in the time slot where there is no order in the main area B to G near a current food truck by using the past order data stored in the order database (DB).

Accordingly, the franchise food truck integrated management system 100 according to the present invention provides information on a screen so as to move to a middle location between a location with the highest relative probability that an order will occur at the time of the corresponding time slot and a location with the next highest relative probability.

Therefore, the user (i.e., driver) operates the food truck to move to the middle location between the location with the highest relative probability that the orders are to be placed for the predetermined period of time from the current time and the location with the next highest relative probability, and takes the orders for the food menu items there.

Meanwhile, the franchise food truck integrated management system according to the exemplary embodiment of the present invention is not limited to the above-described embodiment, and may provide a service supplying, to the corresponding food trucks, a large-capacity battery required in each food truck 162 to 164 according to the request of each food truck. In this case, the franchise food truck integrated management system of the present invention may provide the service by using the technology being implemented in the same technical field.

As described above, according to the present invention, the franchise food truck integrated management system and method thereof may be implemented, wherein, in a situation where food trucks are distributed in each region across a country, the status of food ingredients of each food truck is checked in real time, so as to enable the food ingredients to be supplied to food trucks with insufficient food ingredients or supplied to food trucks that have requested the food ingredients.

In addition, the present invention may implement the franchise food truck integrated management system and method thereof, wherein for the food trucks with insufficient food supply due to high demand, other food trucks with plenty of food ingredients and having no customers may approach the food trucks with insufficient food supply, so as to supply the food ingredients and provide food menu items together.

Figure 21:
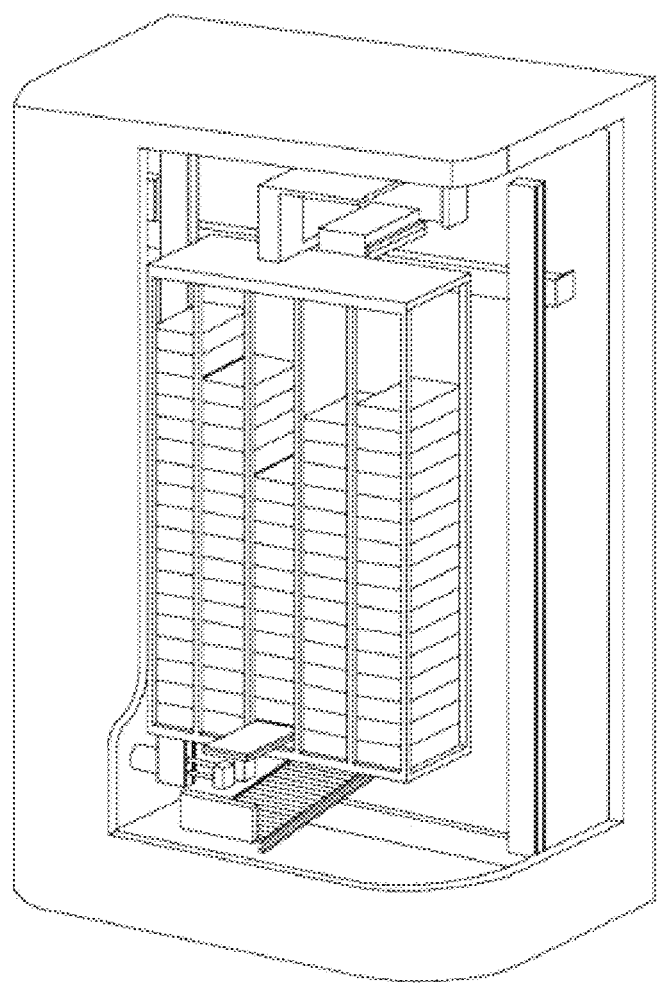
FIG. 21 is a view showing an example of an ingredient storing part in each food truck according to the exemplary embodiment of the present invention.

FIG. 21 is a view showing an example of an ingredient storing part in each food truck according to the exemplary embodiment of the present invention.

Referring to FIG. 21, the ingredient storing part 210 according to the present invention may be configured in a form in which, for example, food ingredients are arranged in the storage according to X and Y coordinates, and the discharge unit pushes the food ingredients at the corresponding coordinates out or takes out and brings the food ingredients.

For example, when the discharge unit is of a push-out type, the discharge unit may include a first plate member and a second plate member. In this case, the first plate member and the second plate member may be integrally formed.

The first plate member may be coupled to a driving unit, and the second plate member may be coupled to the first plate member and arranged to be more inclined toward a moving direction of the discharging unit than the first plate member, that is, toward a direction in which food ingredients are discharged.

In this way, the second plate member is formed to be inclined in the moving direction of the discharge unit, so that it is possible to reduce a distance between a point of action of force of the discharging unit pushing the food ingredients and a point to which the first plate member and the driving unit are coupled to each other, specifically, a point where a chain is coupled thereto, whereby a magnitude of the force for pushing the food ingredients may be further increased, and thus, as a result, a plurality of food ingredients may be more stably discharged.

The driving unit may be coupled to a lower part of the storage part to provide a driving force for movement to the discharge unit. A housing may be coupled to the lower part of the storage, and the driving unit and discharge unit coupled thereto may be installed inside the housing. The housing may be formed integrally with the storage, but may be separately manufactured and combined with the storage for convenience in manufacturing.

The driving unit may be composed of a power generator and a power transmitter. The power generator and the power transmitter may be respectively coupled to the inside of the housing.

The power generator generates a driving force for movement of the discharge unit, and may be configured as, for example, a motor, and a geared motor in which a gear box is coupled to a rotating shaft of the motor may be used. The power generator may be installed on a side wall of the housing. The power transmitter may be interposed between the power generator and the discharge unit to transmit the driving force of the power generator to the discharge unit. More specifically, the power transmitter may include a first sprocket, a second sprocket, and a chain. The first sprocket may be coupled to an output shaft of the power generator to rotate, and the second sprocket may be arranged to be spaced apart from the first sprocket to be rotatably supported by the rotating shaft on opposite sides of the housing. In addition, the chain may be capable of performing orbital motion to transmit the rotational force of the first sprocket to the second sprocket by interconnecting the first sprocket and the second sprocket with each other.

In this case, the first plate member of the discharge unit may be fixedly coupled to the chain. Therefore, when the first sprocket receives power from the power generator and transmits the power to the second sprocket and the chain, the discharge unit coupled to the chain moves in the front-rear direction to push food ingredients to the outside.

FIG. 22 is a view showing an example of an ingredient loading part and an unloading part in the cooked food delivery device according to the exemplary embodiment of the present invention.

Referring to FIG. 22, the ingredient loading part 212 or unloading part 214 according to the present invention has a high rigidity and compact structure, and may be implemented by a two to three axis linear actuator for moving the food ingredients in the position according to the X coordinate and the Y coordinate upward, downward, leftward, and rightward. The maximum speed for the ingredient loading part 212 or unloading part 214 is 1000 mm/s, which may realize high speed, the standard stroke may be made in size of 2000 mm in maximum, the repeat position accuracy has a high precision within 5 μm, a stainless cover structure is applied, and the ingredient loading part 212 or unloading part 214 may be implemented with low dust generation, dust resistance, and low noise.

In addition, the ingredient loading part 212 or unloading part 214 according to the present invention may use a Cartesian robot. The Cartesian robot uses a ball screw and a linear motion guide that use ball recirculation method, so as to convert the rotational motion of a servo motor into a linear motion, thereby controlling positions of a constant weight (i.e., food ingredients) on a precise straight line.

In addition, the ingredient loading part 212 or unloading part 214 according to the present invention may roll an outer ring of a ball bearing on a thread of a screw, which is ground into a V-groove, in two places on the left and right and roll eight track roller bearings on a hardened & ground shaft, so as to convert the rotational motion of a servomotor into the linear motion, whereby position control may be performed on a precise straight line for the constant weight.

Meanwhile, in each food truck 200 according to the present invention, although not shown in the drawings, the cabin 1 is configured to include a bottom part, a side part provided with a window, and a ceiling part, so that a cooking space and an accommodation space in which cooking utensils and the like may be arranged are formed therein.

The bottom part is a component constituting a bottom surface of the cabin 1 of the food truck according to the exemplary embodiment of the present invention.

The side part is a component constituting a side surface of the cabin 1 of the food truck, and may be configured to include: an inverted "T"-shaped longitudinal beam that serves as a support column; a horizontal plate that is fastened in a transverse direction between longitudinal beams to enhance overall rigidity; a plurality of external panels attached between the longitudinal beams; a heat dissipation panel fitted into a matrix-shaped groove standardized by a longitudinal beam and the horizontal plate; and an inner panel fitted into each groove on the heat dissipation panel.

Meanwhile, the side part and the ceiling part are composed of a plurality of external panels. That is, the outer panel may include a side panel and a ceiling panel. Here, in this case, the side panel is prefabricated to be installed between one longitudinal beam and the other longitudinal beam, and the external panels of various sizes are installed between the vertical beams according to an external shape. In addition, the part to which the external panels are not attached constitutes the window, and it is possible to directly observe internal cooking conditions through the window from the outside.

Here, in this case, the side panel may include a support panel and a general panel. The support panel is installed at a bottom edge of the cabin 1 of the food truck to have a first rigidity. Together with the longitudinal beams, these support panels serve as support for each corner. In this case, the support panel may be made of a thick plate steel material having a higher rigidity than that of a general panel.

The general panel has a second rigidity, which is a general rigidity lower than the first rigidity, and may be composed of thin steel or a synthetic resin material having a lower rigidity than that of steel.

In this way, by combining the side panels with different types of panels, it is possible to reduce the weight, increase the economic efficiency, and increase the overall support rigidity.

Meanwhile, in each food truck 200 according to the exemplary embodiment of the present invention, the processing and cooking part 216 may include a cooking device configured as follows. That is, the cooking device of the processing and cooking part 216 may include: an inner part in which food is contained and heated; an outer part installed in a shape surrounding an outer side of the inner part; a heater configured to heat the inner part by using electric energy; a housing installed in a shape surrounding the heater and the outer part; a first driving unit positioned between the outer part and the housing and configured to rotate the inner part in a first direction; and a second driving unit positioned outside the housing and configured to rotate the housing in a second direction. In addition, the cooking device may further include a first stirrer fixed to an inner side of the inner part, rotated together with the inner part, and configured to stir food. The first stirring part may protrude inward of the inner part and extend in a longitudinal direction of the inner part. In addition, the cooking device may further include a second stirrer installed in a direction crossing the first stirrer, located on a base member of the inner part, and configured to stir the food together with the first stirrer. In addition, the second stirrer includes: a core member positioned on an upper side of the base member and provided with magnetic poles on opposite sides; and a fixing member fixed inside the housing facing the core member and provided with the magnetic poles opposite to those of the core member, wherein, when the inner part is rotated, the rotation of the core member may be constrained by the fixing member.

Here, the first direction is a direction in which the inner part is rotated around a first virtual line extending in the longitudinal direction of the inner part, and the second direction may be a direction in which the housing is rotated around a second virtual line extending to a side of the housing.

In addition, the heater may include an induction wire installed in a shape surrounding an outer side of the outer part. In addition, the first driving unit may include a first motor member fixed to the housing facing the outer part and configured to convert electric energy into rotational power. In addition, the output shaft of the first motor member is connected to the center of rotation of the inner part to rotate the inner part in the first direction. In addition, a second driving unit may include: a second motor member installed at a position spaced apart from the housing and configured to convert electric energy into the rotational power; and a power transmitter configured to connect the output shaft of the second motor member and the housing to each other. In addition, the housing configured to receive power from the second motor member may be rotated in the second direction. In addition, the second driving unit may further include: a member to be measured fixed to the power transmitter and rotated together with the power transmitter; and a sensor member installed at a position facing a movement path of the member to be measured and configured to detect movement of the member to be measured in a non-contact manner.

In addition, the second driving unit may further include: an inner support configured to support the second motor member; and an elevator configured to lift and lower the inner support. In addition, the elevator may include: an elevating body positioned on a lower side of the inner support and configured to generate power; and a rod member configured to protrude upwardly of the elevating body, connected to the inner support, and configured to move in the vertical direction by operation of the elevating body.

In addition, the cooking device may further include: a body part configured to support the second driving unit; a water collecting part configured to form a concave groove on an upper side of the body part facing the housing; and a spraying part installed in the body part and configured to spray water toward the inner part or the housing. In addition, the cooking device may further include: a direct-fired pipe configured to supply fuel gas toward the inner part; and a valve connected to the direct-fired pipe and configured to control movement of the fuel gas.

In the above, the exemplary embodiments of the present invention have been mainly described, but various changes or modifications can be made at the level of those skilled in the art to which the present invention pertains. Such changes and modifications can be said to belong to the present invention without departing from the scope of the technical spirit provided by the present invention. Accordingly, the scope of the present invention should be determined by the claims described below.

The invention claimed is:
1. A cooked food delivery device installed on a food truck, the device comprising:
an order reception part configured for receiving an order for food menu items from a consumer terminal via wireless communication and generating order information;
a database configured for storing the order information;
a controller configured for controlling the order reception part;
an ingredient storing part configured for storing food ingredients for cooking food menu items;
an ingredient loading part configured for selecting, from the ingredient storing part, the food ingredients for cooking the ordered food menu item, and conveying and loading the food ingredients to a processing and cooking part; and
the processing and cooking part configured for cooking the ordered food menu items while the food truck moves along a delivery route;
wherein the order information includes at least the food menu items ordered, an order time and a delivery address,
wherein the controller is configured for learning a region and a time the order occurred based on past order information stored in the database, and classifying regions in which at least a predefined threshold number of orders occurred into a plurality of major zones,
wherein the controller is further configured for identifying when there is no order for a predetermined time slot based on the current date and time, calculating a relative probability of an occurrence of an order for the major zones located within a predefined radius around the food truck based on said learning, and providing a midpoint between a major zone with the highest relative probability of an occurrence of an order in said predetermined time slot and a major zone with the next highest relative probability of an occurrence of an order in said predetermined time slot, and wherein, without receiving input from a human user, the controller automatically starts operating the ingredient loading part and the processing and cooking part according to the order information received through the order reception part so that the food menu item starts being cooked according to the order.

2. The cooked food delivery device of claim 1, further comprising:

a cooking camera obtaining cooking images by photographing a process by which food is cooked;

a front camera obtaining front images by photographing front views of roads on which the food truck moves; and a rear display part installed at a rear side of the food truck.

3. The cooked food delivery device of claim 1, further comprising a route determination part, wherein the route determination part determines a delivery route for the ordered food menu item based on the order information and determines an optimal delivery route for the ordered food menu item by applying conditions about straight roads, curved roads, traffic lights, intersections, and speed bumps based on the order information that includes one of the following: a quick delivery requested by the consumer terminal within a certain period of time, a delayed delivery beyond a certain amount of time, or a request to split the delivery location of the food menu.

4. The cooked food delivery device of claim 1, wherein the controller is configured to calculate an orderable menu, available delivery time and quantity according to the status of other orders and the current location of the food truck, and to receive the orders for the food menu items through the order reception part on the basis of the calculated orderable menu and the available delivery time and quantity.

5. The cooked food delivery device of claim 2, wherein the controller controls the food truck to provide the consumer terminal with a degree of cooking of said ordered food menu items and an estimated time of arrival while traveling along the determined delivery route.

6. A method for a cooked food delivery device providing a moving location of a food truck, wherein the food truck is equipped with the cooked food delivery device that wirelessly receives food orders from a customer terminal, an ingredient storing part that stores food ingredients, an ingredient loading part that selects and conveys the food ingredients for ordered food items from the ingredient storing part to a processing and cooking part, and the processing and cooking part that cooks the ordered food items, the method comprising:

a first step of wirelessly receiving, by the cooked food delivery device, an order for food menu items from a customer terminal, generating order information, and storing the order information in a database;

a second step of learning, by the cooked food delivery device, a region and a time the order occurred based on past order information stored in the database;

a third step of categorizing, by the cooked food delivery device, regions with at least a predefined threshold number of orders occurred into a plurality of major zones using the past order information stored in the database;

a fourth step of calculating, by the cooked food delivery device, a relative probability of receiving an order for major zones located within a predefined radius around the food truck based on the learning in the second step and identifying when there is no order for a predetermined time slot based on the current date and time;

a fifth step of providing, by the cooked food delivery device, a midpoint between a major zone with the highest relative probability of an occurrence of an order in the predetermined time slot and a major zone with the next highest relative probability of an occurrence of an order in the predetermined time slot; and a sixth step of automatically, without receiving input from a human user, starting operation of the ingredient loading part and the processing and cooking part to load and cook the food ingredients for the received order for food menu items according to the generated order information.

7. The method for a cooked food delivery device providing a moving location of a food truck of claim 6, wherein the cooked food delivery device calculates an orderable menu, an available delivery time, and a quantity according to the status of other orders and a current location of the food truck and receives the order for the food menu items from the customer terminal on the basis of the calculated orderable menu, delivery time, and a quantity of food menu items in the order in the first step.

8. The method for a cooked food delivery device providing a moving location of a food truck of claim 6, further comprising:

a seventh step of determining, by the cooked food delivery device, an optimal delivery route for the ordered food menu items by applying conditions about straight roads, curved roads, traffic lights, intersections, and speed bumps.

9. The method for a cooked food delivery device providing a moving location of a food truck of claim 8, further comprising:

an eighth step of cooking, by the processing and cooking part, the ordered food menu items while the food truck travels along the optimal delivery route.

* * * * *